US012743648B2

(12) United States Patent
Inlek et al.

(10) Patent No.: US 12,743,648 B2
(45) Date of Patent: Sep. 22, 2026

(54) SUBSPACE LEAKAGE POSTSELECTION VIA METASTABLE MANIFOLD SHELVING

(71) Applicant: IonQ, Inc., College Park, MD (US)

(72) Inventors: Ismail Volkan Inlek, Kensington, MD (US); Michael Lurie Goldman, University Park, MD (US)

(73) Assignee: IonQ, Inc., College Park, MD (US)

( * ) Notice: Subject to any disclaimer, the term of this patent is extended or adjusted under 35 U.S.C. 154(b) by 831 days.

(21) Appl. No.: 18/183,762

(22) Filed: Mar. 14, 2023

(65) Prior Publication Data

US 2023/0289645 A1 Sep. 14, 2023

Related U.S. Application Data

(60) Provisional application No. 63/319,660, filed on Mar. 14, 2022.

(51) Int. Cl.
*G06N 10/40* (2022.01)

(52) U.S. Cl.
CPC .................................... *G06N 10/40* (2022.01)

(58) Field of Classification Search
CPC ............................... G06N 10/40; G06N 10/70
See application file for complete search history.

(56) References Cited

U.S. PATENT DOCUMENTS

| | | | | |
|---|---|---|---|---|
| 10,217,057 | B2 * | 2/2019 | Barends | F41J 1/10 |
| 11,562,284 | B1 * | 1/2023 | Ryan | G06N 10/00 |
| 12,536,463 | B2 * | 1/2026 | Martinis | G06N 10/70 |
| 2019/0303788 | A1 * | 10/2019 | Kelly | G06N 10/70 |
| 2021/0035007 | A1 * | 2/2021 | Martinis | G06F 15/80 |
| 2021/0272005 | A1 * | 9/2021 | King | G06N 10/20 |
| 2021/0342161 | A1 * | 11/2021 | Lauer | G06F 9/442 |
| 2024/0193452 | A1 * | 6/2024 | Lester | G06N 10/20 |
| 2024/0394585 | A1 * | 11/2024 | Reagor | G06N 10/70 |
| 2025/0055457 | A1 * | 2/2025 | Whittaker | G06N 10/40 |
| 2025/0165828 | A1 * | 5/2025 | Mäkinen | G06N 10/20 |
| 2025/0165843 | A1 * | 5/2025 | Thompson | G06F 11/004 |
| 2025/0245536 | A1 * | 7/2025 | Przybysz | G01R 33/0358 |

* cited by examiner

*Primary Examiner* — Nha T Nguyen
(74) *Attorney, Agent, or Firm* — ARENTFOX SCHIFF LLP

(57) ABSTRACT

Aspects of the present disclosure relate generally to systems and methods for use in the implementation and/or operation of quantum information processing (QIP) systems, including trapped-ion QIP systems. A technique is described in which it is possible to detect at the end of a computational sequence whether an ion has undergone a transition to a state outside a computational subspace, which can only happen because of a spontaneous emission event or other error, referred to as subspace leakage errors. By detecting instances in which the ion finishes the computation outside the computational subspace and subsequently rejecting the results of those specific runs, it is possible to mitigate some or all of the infidelity caused by the subspace leakage errors.

24 Claims, 19 Drawing Sheets

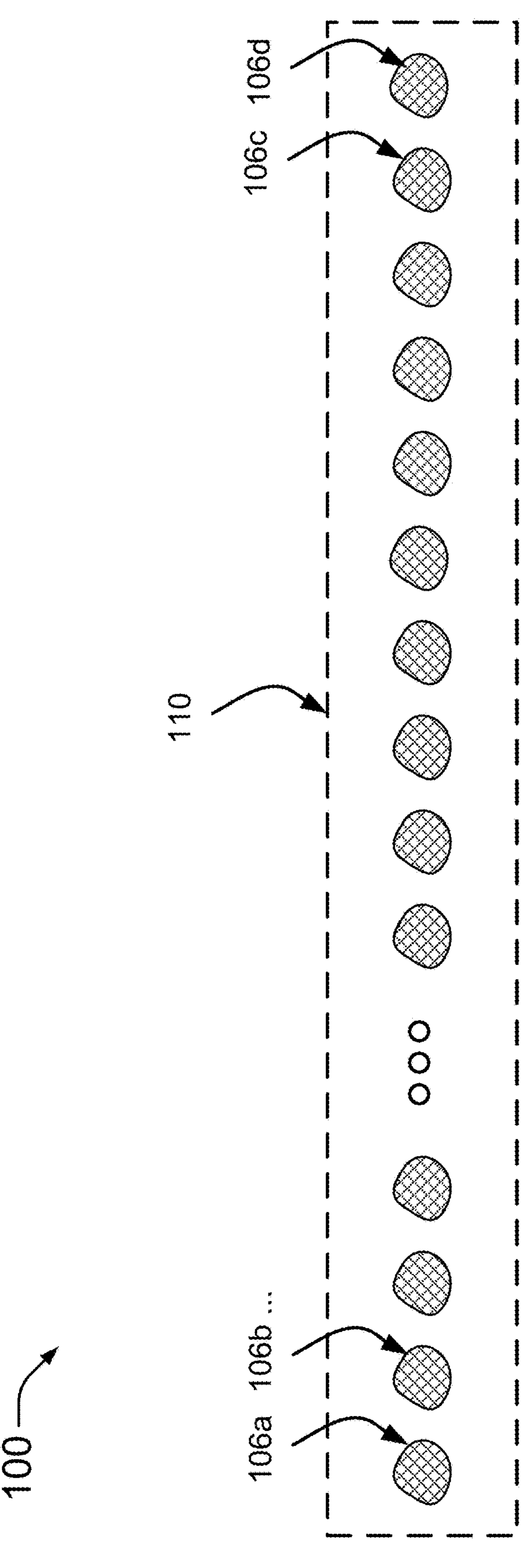
FIG. 1

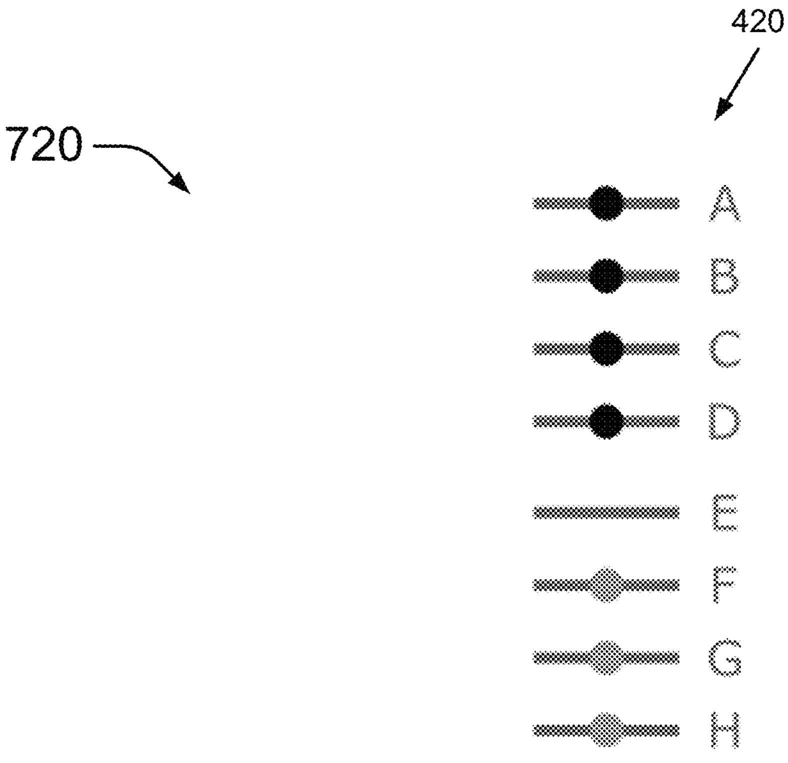
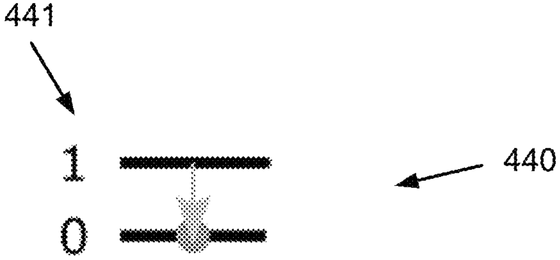
FIG. 7B

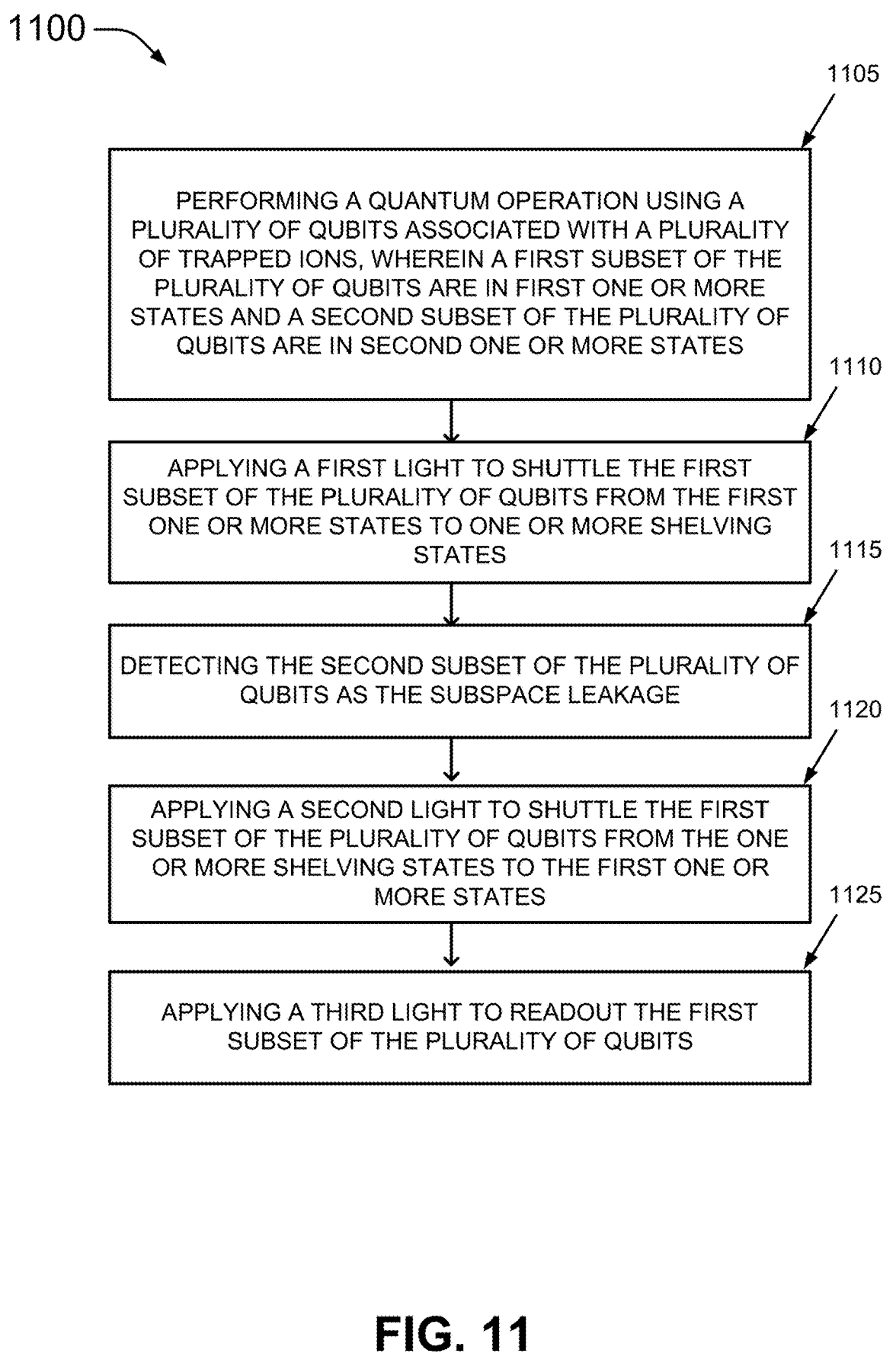

1100

1105

PERFORMING A QUANTUM OPERATION USING A PLURALITY OF QUBITS ASSOCIATED WITH A PLURALITY OF TRAPPED IONS, WHEREIN A FIRST SUBSET OF THE PLURALITY OF QUBITS ARE IN FIRST ONE OR MORE STATES AND A SECOND SUBSET OF THE PLURALITY OF QUBITS ARE IN SECOND ONE OR MORE STATES

1110

APPLYING A FIRST LIGHT TO SHUTTLE THE FIRST SUBSET OF THE PLURALITY OF QUBITS FROM THE FIRST ONE OR MORE STATES TO ONE OR MORE SHELVING STATES

1115

DETECTING THE SECOND SUBSET OF THE PLURALITY OF QUBITS AS THE SUBSPACE LEAKAGE

1120

APPLYING A SECOND LIGHT TO SHUTTLE THE FIRST SUBSET OF THE PLURALITY OF QUBITS FROM THE ONE OR MORE SHELVING STATES TO THE FIRST ONE OR MORE STATES

1125

APPLYING A THIRD LIGHT TO READOUT THE FIRST SUBSET OF THE PLURALITY OF QUBITS

FIG. 11

SUBSPACE LEAKAGE POSTSELECTION VIA METASTABLE MANIFOLD SHELVING

CROSS REFERENCE TO RELATED APPLICATIONS

The current application claims priority to, and the benefit of, U.S. Provisional Application No. 63/319,660 filed Mar. 14, 2022 entitled "SUBSPACE LEAKAGE POSTSELECTION VIA METASTABLE MANIFOLD SHELVING," the contents of which are hereby incorporated by reference in their entireties.

BACKGROUND

Aspects of the present disclosure relate generally to systems and methods for use in the implementation and/or operation of quantum information processing (QIP) systems.

Trapped atoms are one of the leading implementations for quantum information processing or quantum computing. Atomic-based qubits may be used as quantum memories, as quantum gates in quantum computers and simulators, and may act as nodes for quantum communication networks. Qubits based on trapped atomic ions enjoy a rare combination of attributes. For example, qubits based on trapped atomic ions have very good coherence properties, may be prepared and measured with nearly 100% efficiency, and are readily entangled with each other by modulating their Coulomb interaction with suitable external control fields such as optical or microwave fields. These attributes make atomic-based qubits attractive for extended quantum operations such as quantum computations or quantum simulations.

It is therefore important to develop new techniques that improve the design, fabrication, implementation, and/or control of different QIP systems used as quantum computers or quantum simulators, and particularly for those QIP systems that handle operations based on atomic-based qubits.

SUMMARY

The following presents a simplified summary of one or more aspects to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

This disclosure describes various aspects of a technique based on shelving the qubit states in a quantum information processing (QIP) system to a metastable manifold to detect subspace leakage error, where if a subspace leakage is detected to have occurred, the results of that particular run can be discarded.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 1 illustrates a view of atomic ions a linear crystal or chain in accordance with aspects of this disclosure.

FIG. 7B illustrates an example of a second step of the multi-pulse deshelving sequence in which the population that was deshelved in the first step on optically pumped to the 0 qubit state in accordance with aspects of this disclosure.

FIG. 11 illustrates an example of a method detecting subspace leakage in accordance with aspects of this disclosure.

DETAILED DESCRIPTION

The detailed description set forth below in connection with the appended drawings or figures is intended as a description of various configurations or implementations and is not intended to represent the only configurations or implementations in which the concepts described herein may be practiced. The detailed description includes specific details for the purpose of providing a thorough understanding of various concepts. However, it will be apparent to those skilled in the art that these concepts may be practiced without these specific details or with variations of these specific details. In some instances, well known components are shown in block diagram form, while some blocks may be representative of one or more well known components.

In QIP systems based on trapped ions, the qubits are manipulated using Raman transitions, where a strong laser is applied that is far from resonance with the ion's optical transitions in such a way that the qubit state can be manipulated without significantly exciting these optical transitions. However, it is inevitable that these optical transitions will be excited with some small probability while performing Raman manipulation. Excitation of these transitions can lead to spontaneous emission of a photon, which can cause errors in the quantum computation. The minimum ratio of this error rate to the number of Raman-based gates that can be performed is set by the wavelength of the Raman laser and by the intrinsic properties of the ion, so this spontaneous emission error can set a minimum bound on the error rate of our Raman-based computations.

Solutions to the issues described above are explained in more detail in connection with FIGS. 1-10B, with FIGS. 1-3 providing a background of QIP systems or quantum computers, and more specifically, of atomic-based QIP systems or quantum computers such as trapped-ion QIP systems, for example.

Figure 2:
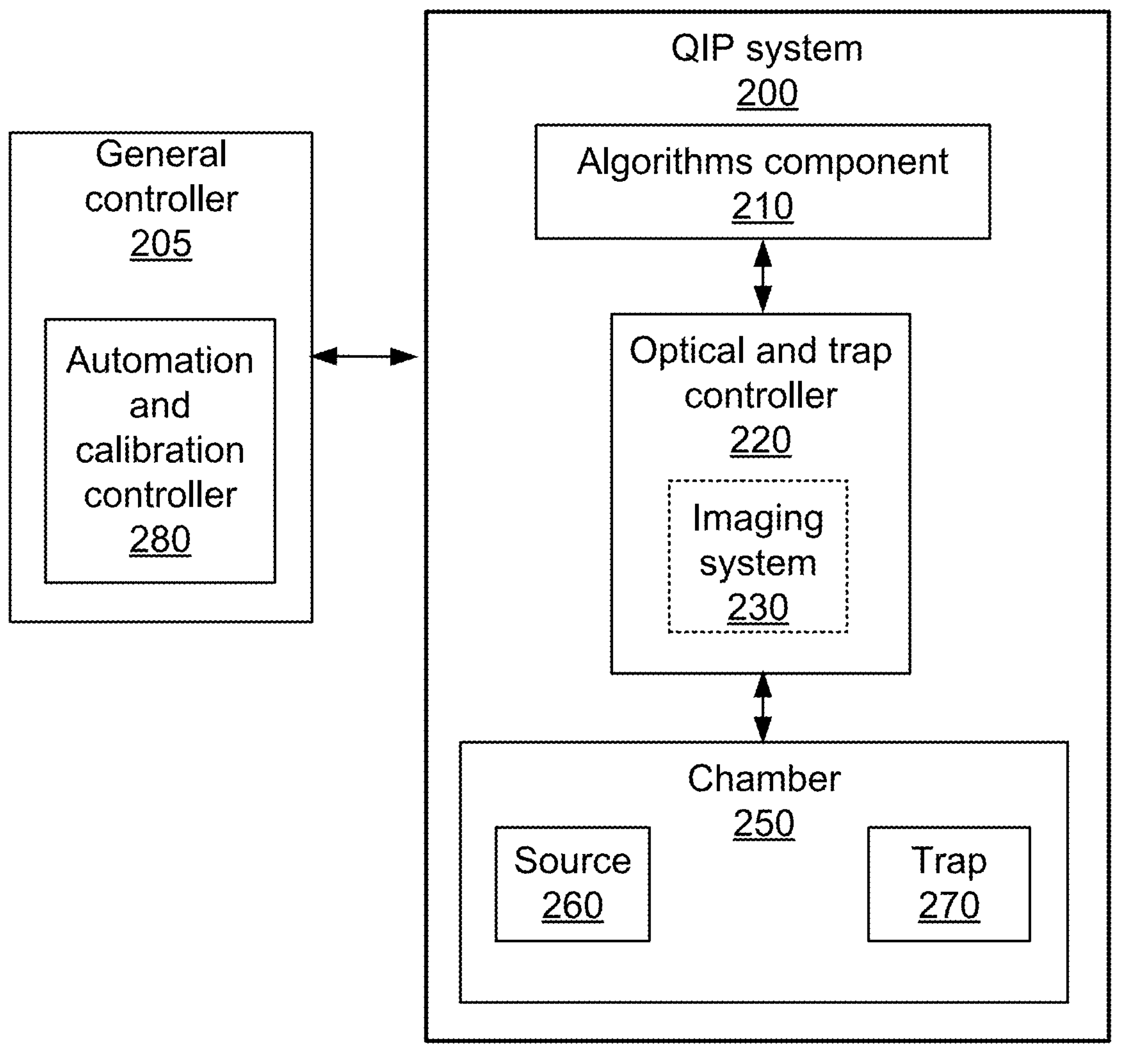
FIG. 2 illustrates an example of a quantum information processing (QIP) system in accordance with aspects of this disclosure.

FIG. 1 shown below illustrates a diagram 100 with multiple atomic ions 106 (e.g., atomic ions 106*a*, 106*b*, . . . , 106*c*, and 106*d*) trapped in a linear crystal or chain 110 using a trap (the trap can be inside a vacuum chamber as shown in FIG. 2). The trap maybe referred to as an ion trap. The ion trap shown may be built or fabricated on a semiconductor substrate, a dielectric substrate, or a glass die or wafer (also referred to as a glass substrate). The atomic ions 106 may be provided to the trap as atomic species for ionization and confinement into the chain 110.

In the example shown in FIG. 1, the trap includes electrodes for trapping or confining multiple atomic ions into the chain 110 that are laser-cooled to be nearly at rest. The number of atomic ions (N) trapped can be configurable and more or fewer atomic ions may be trapped. The atomic ions can be Ytterbium ions (e.g., $^{171}Y^{+}$ ions), for example. The atomic ions are illuminated with laser (optical) radiation tuned to a resonance in $^{171}Yb^{+}$ and the fluorescence of the atomic ions is imaged onto a camera or some other type of detection device. In this example, atomic ions may be separated by about 5 microns (μm) from each other, although the separation may be smaller or larger than 5 μm. The separation of the atomic ions is determined by a balance between the external confinement force and Coulomb repulsion and does not need to be uniform. Moreover, in addition to atomic Ytterbium ions, neutral atoms, Rydberg atoms, different atomic ions or different species of atomic ions may also be used (such as one or more isotopes of barium, for example). The trap may be a linear RF Paul trap, but other types of confinement may also be used, including optical confinements. Thus, a confinement device may be based on different techniques and may hold ions, neutral atoms, or Rydberg atoms, for example, with an ion trap being one example of such a confinement device. The ion trap may be a surface trap, for example.

FIG. 2 shown below is a block diagram that illustrates an example of a QIP system 200 in accordance with various aspects of this disclosure.

The QIP system 200 may also be referred to as a quantum computing system, a quantum computer, a computer device, a trapped ion system, or the like. The QIP system 200 may be part of a hybrid computing system in which the QIP system 200 is used to perform quantum computations and operations and the hybrid computing system also includes a classical computer to perform classical computations and operations.

Shown in FIG. 2 is a general controller 205 configured to perform various control operations of the QIP system 200. Instructions for the control operations may be stored in memory (not shown) in the general controller 205 and may be updated over time through a communications interface (not shown). Although the general controller 205 is shown separate from the QIP system 200, the general controller 205 may be integrated with or be part of the QIP system 200. The general controller 205 may include an automation and calibration controller 280 configured to perform various calibration, testing, and automation operations associated with the QIP system 200.

The QIP system 200 may include an algorithms component 210 that may operate with other parts of the QIP system 200 to perform quantum algorithms or quantum operations, including a stack or sequence of combinations of single qubit operations and/or multi-qubit operations (e.g., two-qubit operations) as well as extended quantum computations. As such, the algorithms component 210 may provide instructions to various components of the QIP system 200 (e.g., to the optical and trap controller 220) to enable the implementation of the quantum algorithms or quantum operations. The algorithms component 210 may receive information resulting from the implementation of the quantum algorithms or quantum operations and may process the information and/or transfer the information to another component of the QIP system 200 or to another device for further processing.

The QIP system 200 may include an optical and trap controller 220 that controls various aspects of a trap 270 in a chamber 250, including the generation of signals to control the trap 270, and controls the operation of lasers and optical systems that provide optical beams that interact with the atoms or ions in the trap. When used to confine or trap ions, the trap 270 may be referred to as an ion trap. The trap 270, however, may also be used to trap neutral atoms, Rydberg atoms, different atomic ions or different species of atomic ions. The lasers and optical systems can be at least partially located in the optical and trap controller 220 and/or in the chamber 250. For example, optical systems within the chamber 250 may refer to optical components or optical assemblies.

The QIP system 200 may include an imaging system 230. The imaging system 230 may include a high-resolution imager (e.g., CCD camera) or other type of detection device (e.g., photomultiplier tube or PMT) for monitoring the atomic ions while they are being provided to the trap 270 and/or after they have been provided to the trap 270. In an aspect, the imaging system 230 can be implemented separate from the optical and trap controller 220, however, the use of fluorescence to detect, identify, and label atomic ions using image processing algorithms may need to be coordinated with the optical and trap controller 220.

In addition to the components described above, the QIP system 200 can include a source 260 that provides atomic species (e.g., a plume or flux of neutral atoms) to the chamber 250 having the trap 270. When atomic ions are the basis of the quantum operations, that trap 270 confines the atomic species once ionized (e.g., photoionized). The trap 270 may be part of a processor or processing portion of the QIP system 200. That is, the trap 270 may be considered at the core of the processing operations of the QIP system 200 since it holds the atomic-based qubits that are used to perform the quantum operations or simulations. At least a portion of the source 260 may be implemented separate from the chamber 250.

It is to be understood that the various components of the QIP system 200 described in FIG. 2 are described at a high-level for ease of understanding. Such components may include one or more sub-components, the details of which may be provided below as needed to better understand certain aspects of this disclosure.

Aspects of this disclosure may be implemented at least partially using the general controller 205, the automation and calibration controller 280, the optical and trap controller 220, and/or the imaging system 230.

Figure 3:
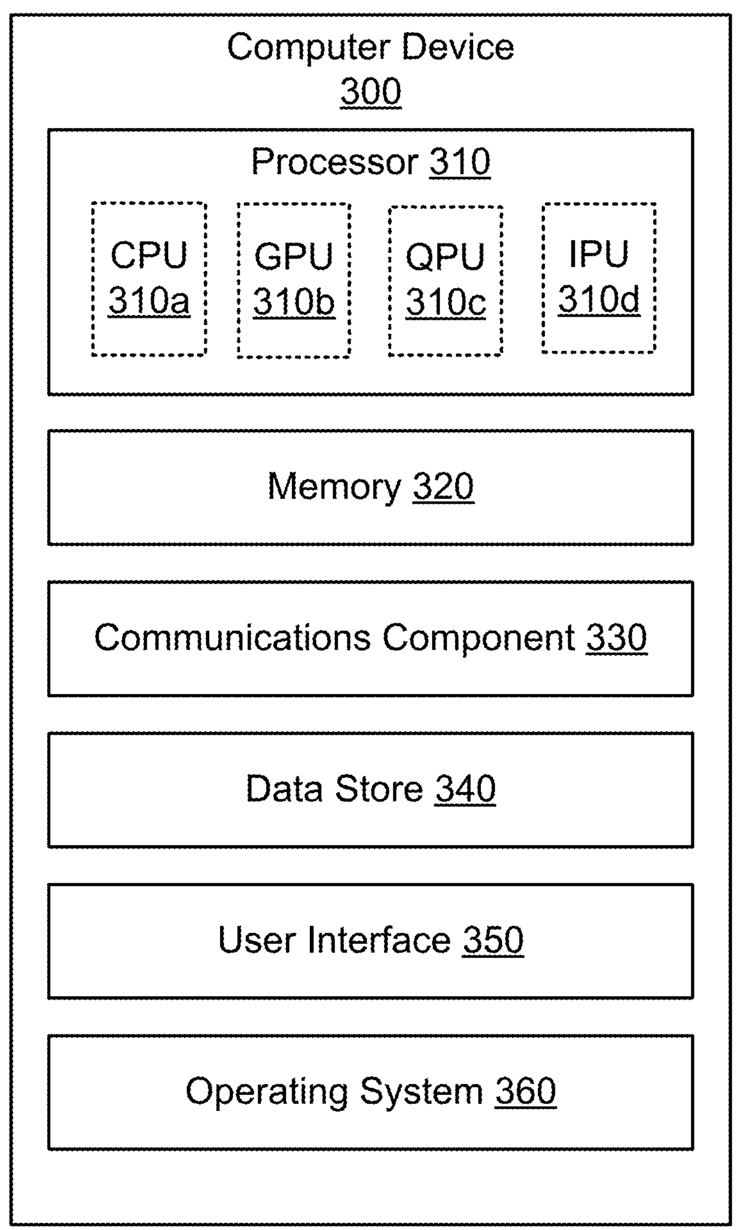
FIG. 3 illustrates an example of a computer device in accordance with aspects of this disclosure.

Referring now to FIG. 3 shown below, illustrated is an example of a computer system or device 300 in accordance with aspects of the disclosure. The computer device 300 can represent a single computing device, multiple computing devices, or a distributed computing system, for example. The computer device 300 may be configured as a quantum computer (e.g., a QIP system), a classical computer, or to perform a combination of quantum and classical computing functions, sometimes referred to as hybrid functions or operations. For example, the computer device 300 may be used to process information using quantum algorithms, classical computer data processing operations, or a combination of both. In some instances, results from one set of operations (e.g., quantum algorithms) are shared with another set of operations (e.g., classical computer data processing). A generic example of the computer device 300 implemented as a QIP system capable of performing quantum computations and simulations is, for example, the QIP system 200 shown in FIG. 2.

The computer device 300 may include a processor 310 for carrying out processing functions associated with one or more of the features described herein. The processor 310 may include a single or multiple set of processors or multi-core processors. Moreover, the processor 310 may be implemented as an integrated processing system and/or a distributed processing system. The processor 310 may include one or more central processing units (CPUs) 310*a*, one or more graphics processing units (GPUs) 310*b*, one or more quantum processing units (QPUs) 310*c*, one or more intelligence processing units (IPUs) 310*d* (e.g., artificial intelligence or AI processors), or a combination of some or all those types of processors. In one aspect, the processor 310 may refer to a general processor of the computer device 300, which may also include additional processors 310 to perform more specific functions (e.g., including functions to control the operation of the computer device 300).

The computer device 300 may include a memory 320 for storing instructions executable by the processor 310 to carry out operations. The memory 320 may also store data for processing by the processor 310 and/or data resulting from processing by the processor 310. In an implementation, for example, the memory 320 may correspond to a computer-readable storage medium that stores code or instructions to perform one or more functions or operations. Just like the processor 310, the memory 320 may refer to a general memory of the computer device 300, which may also include additional memories 320 to store instructions and/or data for more specific functions.

It is to be understood that the processor 310 and the memory 320 may be used in connection with different operations including but not limited to computations, calculations, simulations, controls, calibrations, system management, and other operations of the computer device 300, including any methods or processes described herein.

Further, the computer device 300 may include a communications component 330 that provides for establishing and maintaining communications with one or more parties utilizing hardware, software, and services. The communications component 330 may also be used to carry communications between components on the computer device 300, as well as between the computer device 300 and external devices, such as devices located across a communications network and/or devices serially or locally connected to computer device 300. For example, the communications component 330 may include one or more buses, and may further include transmit chain components and receive chain components associated with a transmitter and receiver, respectively, operable for interfacing with external devices. The communications component 330 may be used to receive updated information for the operation or functionality of the computer device 300.

Additionally, the computer device 300 may include a data store 340, which can be any suitable combination of hardware and/or software, which provides for mass storage of information, databases, and programs employed in connection with the operation of the computer device 300 and/or any methods or processes described herein. For example, the data store 340 may be a data repository for operating system 360 (e.g., classical OS, or quantum OS, or both). In one implementation, the data store 340 may include the memory 320. In an implementation, the processor 310 may execute the operating system 360 and/or applications or programs, and the memory 320 or the data store 340 may store them.

The computer device 300 may also include a user interface component 350 configured to receive inputs from a user of the computer device 300 and further configured to generate outputs for presentation to the user or to provide to a different system (directly or indirectly). The user interface component 350 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, the user interface component 350 may include one or more output devices, including but not limited to a display, a speaker, a haptic feedback mechanism, a printer, any other mechanism capable of presenting an output to a user, or any combination thereof. In an implementation, the user interface component 350 may transmit and/or receive messages corresponding to the operation of the operating system 360. When the computer device 300 is implemented as part of a cloud-based infrastructure solution, the user interface component 350 may be used to allow a user of the cloud-based infrastructure solution to remotely interact with the computer device 300.

As mentioned above, it is highly likely that unintended optical transitions will be excited with some small probability while performing Raman manipulation in QIP systems. Excitation of these transitions can lead to spontaneous emission of a photon, which can cause errors in the quantum computation. The minimum ratio of this error rate to the number of Raman-based gates that can be performed is set by the wavelength of the Raman laser and by the intrinsic properties of the ion, so this spontaneous emission error can set a minimum bound on the error rate of our Raman-based computations.

Figure 4:
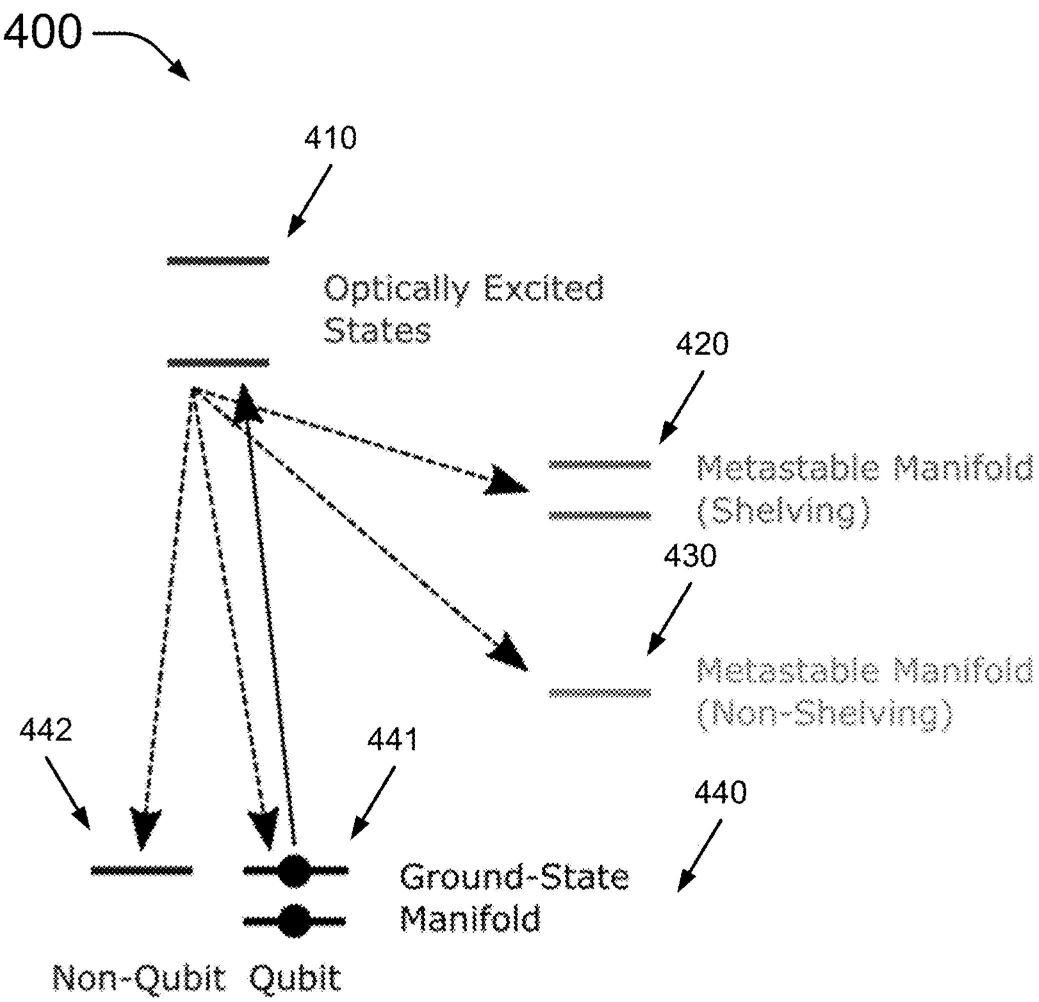
FIG. 4 illustrates an example of a schematic representation of an unwanted optical excitation during Raman manipulation followed by decay into several state manifolds in accordance with aspects of this disclosure.

When the ion (e.g., an ion 106 in the ion chain 110) spontaneously emits a photon, it is possible for the ion's state to decay either back to one of the states that are being used as qubits (i.e., the computational subspace) or to a state that is outside the computational subspace. This process is illustrated schematically in a diagram 400 in FIG. 4 shown below. In principle, it is possible to detect at the end of the sequence whether the ion has undergone a transition to a state outside the computational subspace, which can only happen as the result of a spontaneous emission event or other error (collectively "subspace leakage errors"). By detecting instances in which the ion finishes the computation outside the computational subspace and subsequently rejecting the results of those specific runs, it is possible to mitigate some or all of the infidelity caused by the subspace leakage errors.

The diagram 400 shows a schematic representation of an unwanted optical excitation during Raman manipulations as shown by the solid arrow, followed by decay into several state manifolds as shown by the dashed arrows. For example, an unwanted optical excitation can occur from a qubit state 441 in a ground-state manifold 440 to optically excited states 410. The decay can then occur from the optically excited states 410 to any of a non-qubit state 442 in the ground-state manifold 440, a metastable manifold (for shelving) 420 (also referred to as a shelving metastable manifold), a metastable manifold (not for shelving) 430 (also referred to as a non-shelving metastable manifold), or back to a qubit state 441 in the ground-state manifold 440.

In connection with the systems and representations described above in FIGS. 1-4, the present disclosure describes a technique based on shelving of qubit states to a metastable manifold to detect subspace leakage errors. This shelving is done by applying laser pulses that address the narrow optical transition between the ground-state manifold 440, which contains the qubit states, and the metastable manifold (e.g., metastable manifold 420). Specifically, at the end of a computation, the populations of both qubit states would be shelved (e.g., move temporarily) to this metastable manifold and read out the population left outside the manifold. If any such population is detected, then it would be known that a subspace leakage has occurred, and the result of that run could be discarded. After performing this check, the population of one qubit state can be deshelved from the metastable manifold to read out the qubit state. This sequence of steps is described in more detail in connection with FIGS. 5A-5E.

Figure 5A:
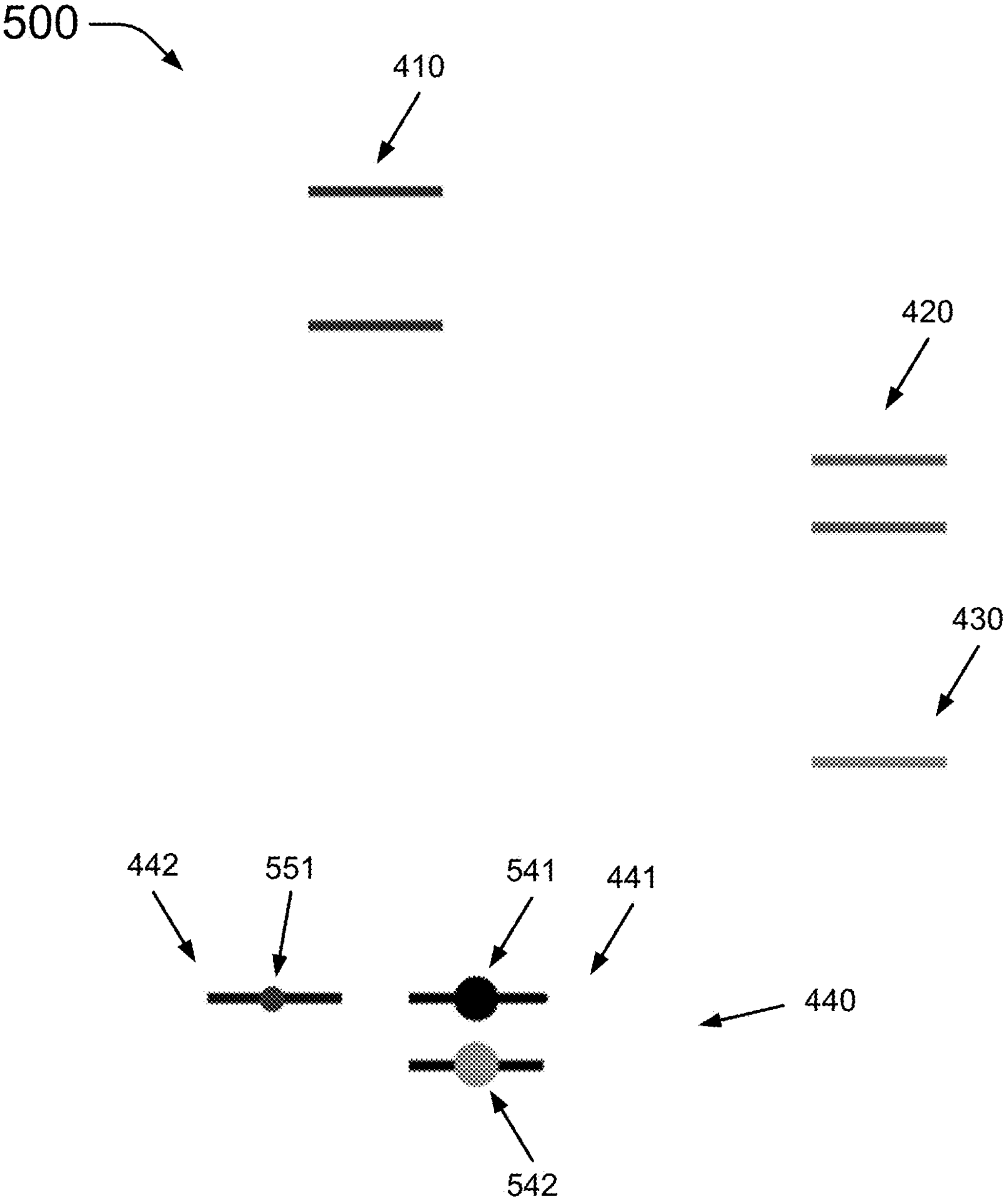
FIG. 5A illustrates an example of the state of the system at the end of computation with most population in the qubit states and a small population in the non-qubit ground states in accordance with aspects of this disclosure.

FIG. 5A shown below includes a diagram 500 that illustrates an example of the state of the system at the end of a computation (e.g., a quantum computation or quantum operation) with most population in the qubit states 441 (e.g., 541, 542) of the ground-state manifold 440 and a small population in the non-qubit states 442 (e.g., 551) of the ground-state manifold 440.

Figure 5B:
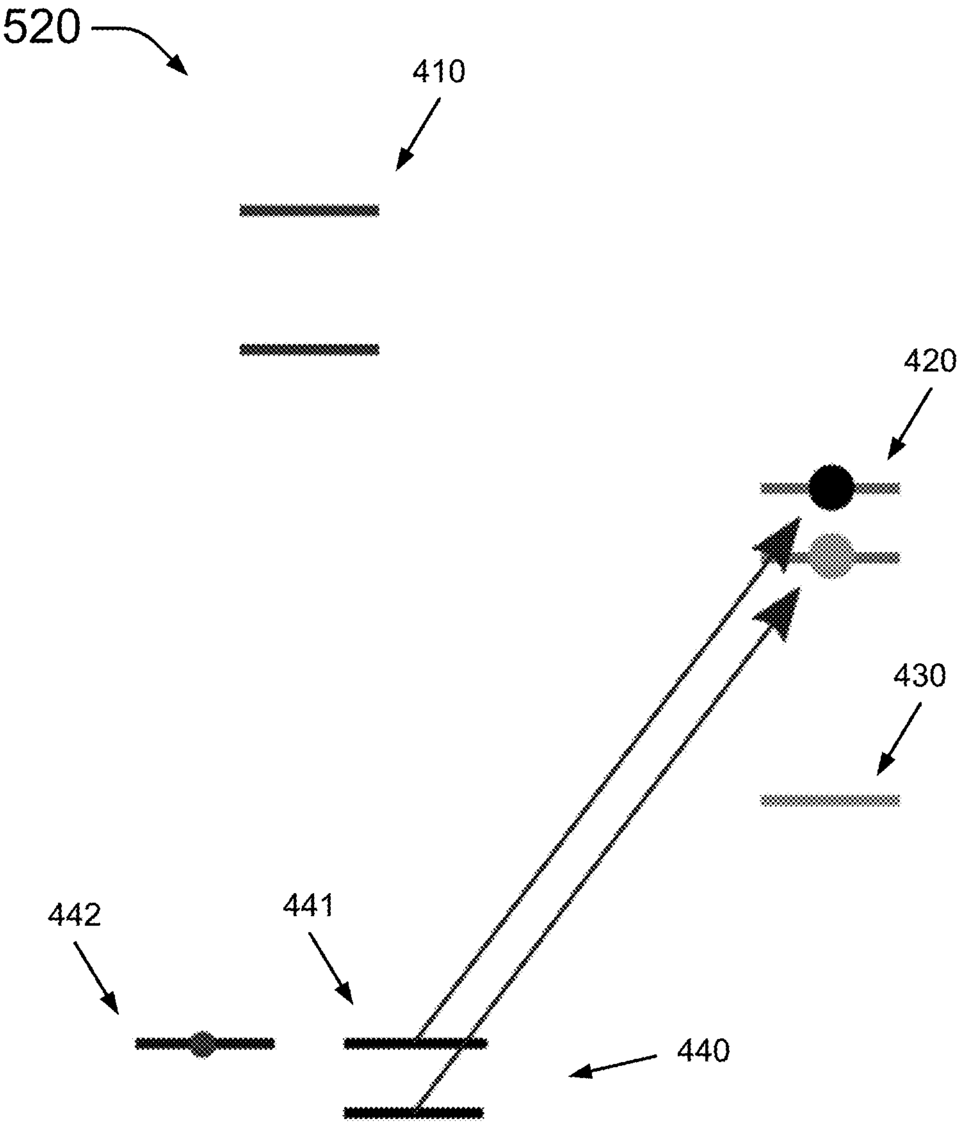
FIG. 5B illustrates an example of shelving of both qubit states in the shelving metastable manifold in accordance with aspects of this disclosure.

FIG. 5B shown below includes a diagram 520 that illustrates an example of shelving of both qubit states (e.g., 541, 542) from the qubit states 441 of the ground-state manifold 440 in the shelving metastable manifold 420.

Figure 5C:
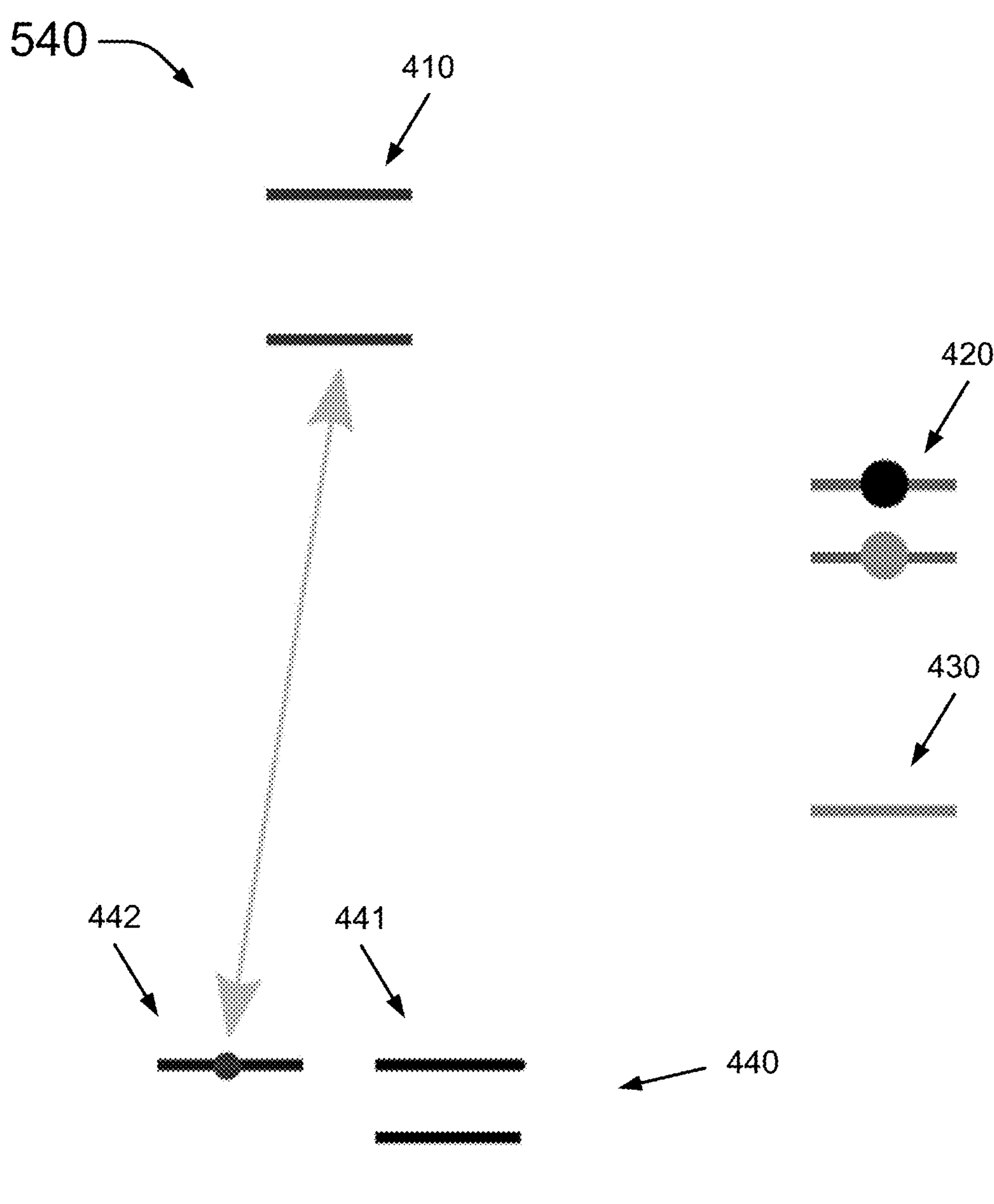
FIG. 5C illustrates an example of detection of any population remaining outside the metastable manifold in accordance with aspects of this disclosure.

FIG. 5C shown below includes a diagram 540 that illustrates an example of detection of any population remaining outside the shelving metastable manifold 420. A repump laser from the non-shelving metastable manifolds 430 is applied for this step but it is not shown.

Figure 5D:
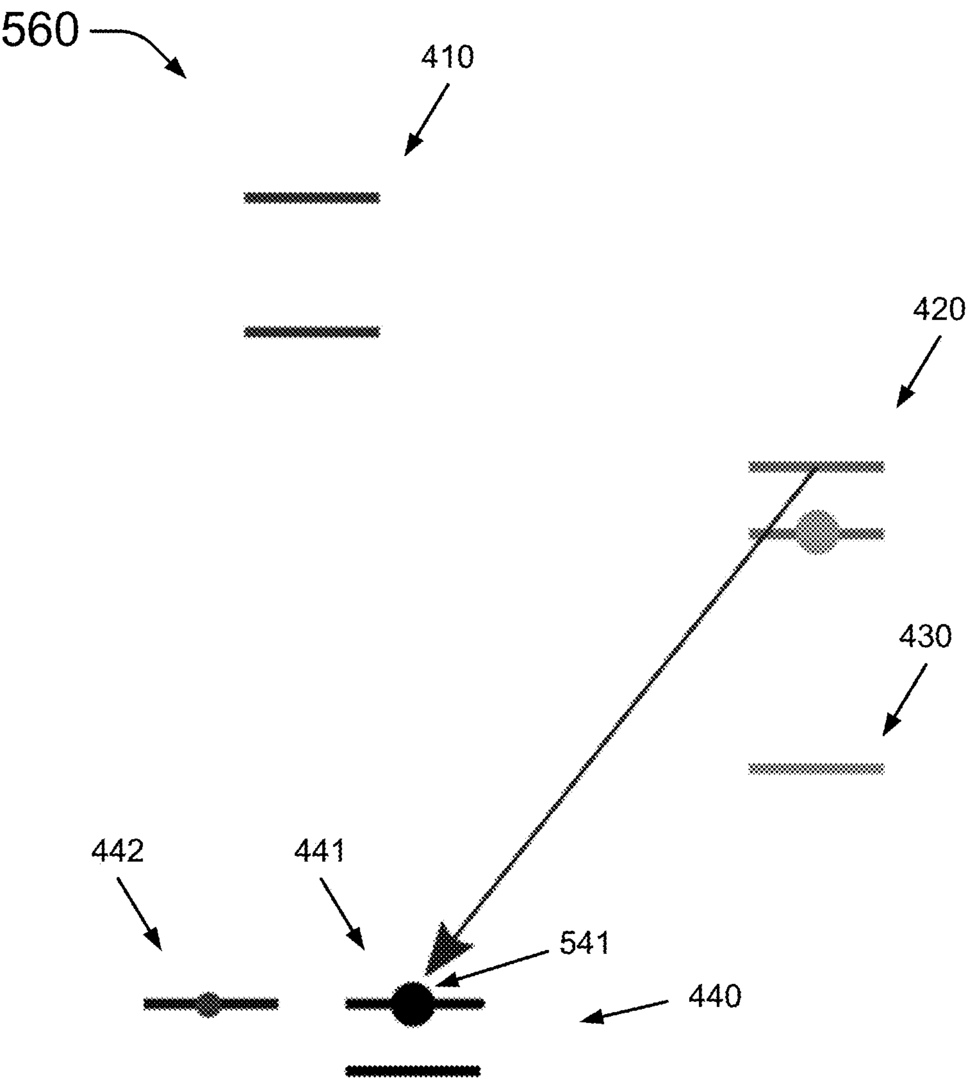
FIG. 5D illustrates an example of deshelving of one qubit state from shelving metastable manifold in accordance with aspects of this disclosure.

FIG. 5D shown below includes a diagram 560 that illustrates an example of deshelving of one qubit state (e.g., 541) from shelving metastable manifold 420 back to the qubit states 441 of the ground state manifold 440.

Figure 5E:
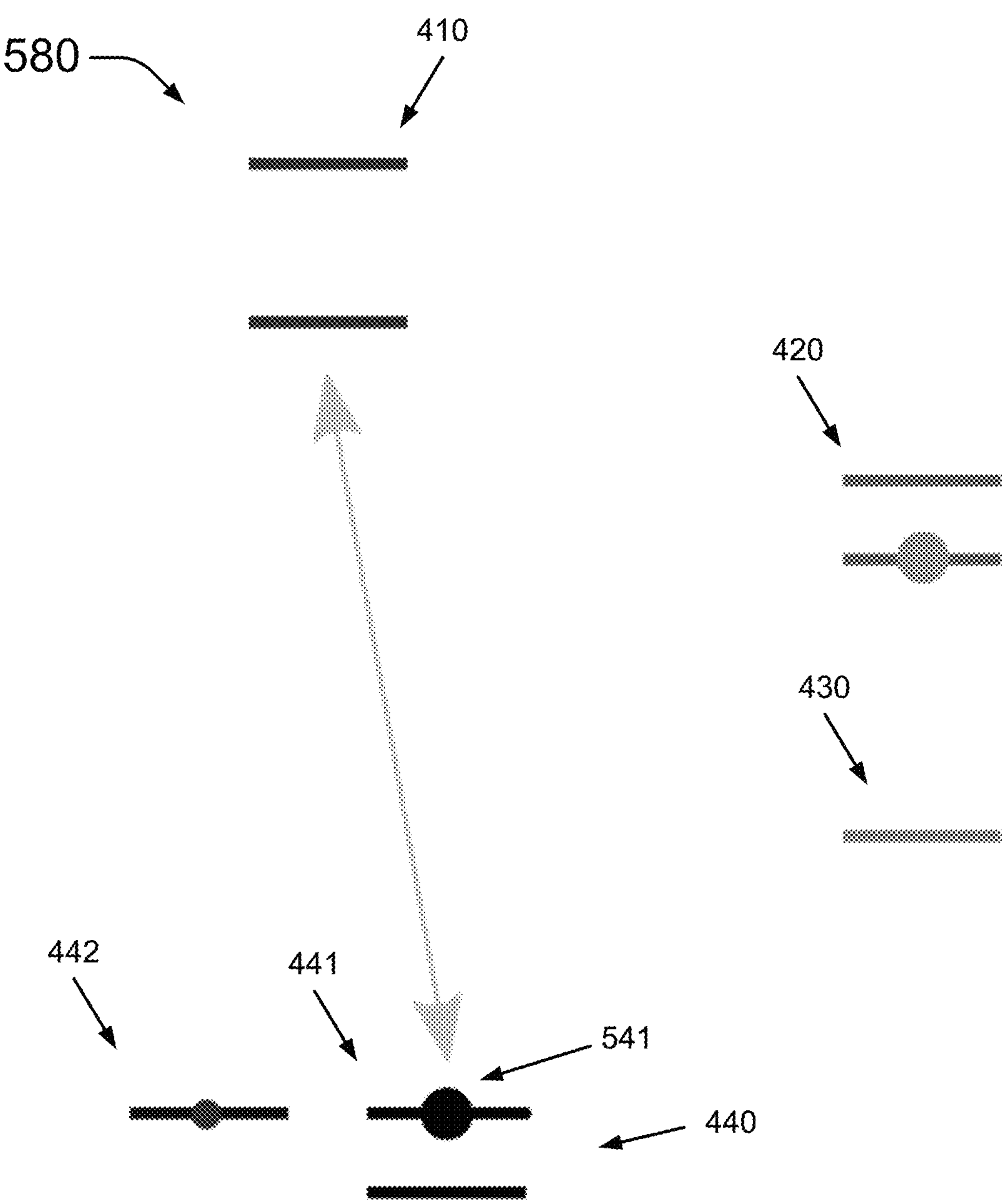
FIG. 5E illustrates an example of a qubit state readout via detection of qubit population that has been deshelved from shelving metastable manifold in accordance with aspects of this disclosure.

FIG. 5E shown below includes a diagram 580 that illustrates an example of a qubit state (e.g., 541) readout via detection of qubit population that has been deshelved from shelving metastable manifold 420 back to the ground state manifold 440. Again, repump lasers from the non-shelving metastable manifolds 430 are applied for this step but this is not shown.

The rejection of the runs during which subspace leakage is detected can occur in real time. For example, the process does not continue to the qubit state detection step after detecting an error. The rejection of the runs may also occur in post-selection. For example, the results of both the error detection and qubit readout steps are recorded and subsequently erroneous runs while analyzing the data are rejected.

By interjecting the additional error check step before the qubit readout step, this may trade additional state preparation and measurement (SPAM) error for a reduction in the effective gate error due to subspace leakage. However, there are techniques that can be employed to minimize the increased SPAM error to an acceptable degree. Since typical computations contain many gates but only one or a few instances of state readout, this tradeoff will generally be favorable.

Deshelving with Multiple Pulses

To increase the fidelity of the shelving-based qubit readout technique described herein, multiple shelving pulses are employed so that the overall error rate of the shelving operation is the product of the error rates of the individual pulses. This dramatically reduces the fidelity required of each individual pulse to achieve an extremely high fidelity of the overall shelving operation.

Accordingly, this disclosure proposed the use of a multi-pulse strategy for both the shelving and deshelving portions of the error-check step. However, this is not a trivial extension of the multi-pulse shelving strategy. For instance, while it is possible to apply sequential pulses to shelve qubit state 1 in the ground-state manifold 440 to metastable states A, B, C, and D (see e.g., FIG. 6) in the metastable manifold (shelving) 420, the process cannot simply be reversed by applying sequential pulses to drive transitions from states A, B, C, and D back to qubit state 1.

A multi-pulse deshelving scheme described herein is capable of deshelving population that had been shelved in multiple metastable states. This scheme takes advantage of the ability to optically pump population within the ground-state manifold 440. The error-detection sequence using multi-pulse shelving and deshelving can proceed as follows (illustrated in FIGS. 6 and 7A-7C):

1. Shelve qubit state 1 from the ground-state manifold 440 to the metastable states A, B, C, and D in the metastable manifold 420 using sequential pulses.
2. Shelve qubit state 0 from the ground-state manifold 440 to the metastable states E, F, G, and H in the metastable manifold 420 using sequential pulses.

3. Detect any population remaining in the ground-state manifold 440 or any manifolds other than the metastable manifold that is being used for shelving (e.g., the metastable manifold 420).
4. Deshelve metastable state E to qubit state 1, or any other state within the ground-state manifold 440 from which it is possible to optically pump.
5. Use optical pumping to empty the state to which the population from E was just deshelved.
6. Deshelve metastable state F to the same state.
7. Repeat steps 5 and 6 for all metastable states to which the qubit state 1 was shelved.
8. Read out the qubit state by detecting the deshelved population, which would indicate that the qubit was in 0 at the end of the computation.

Figure 6:
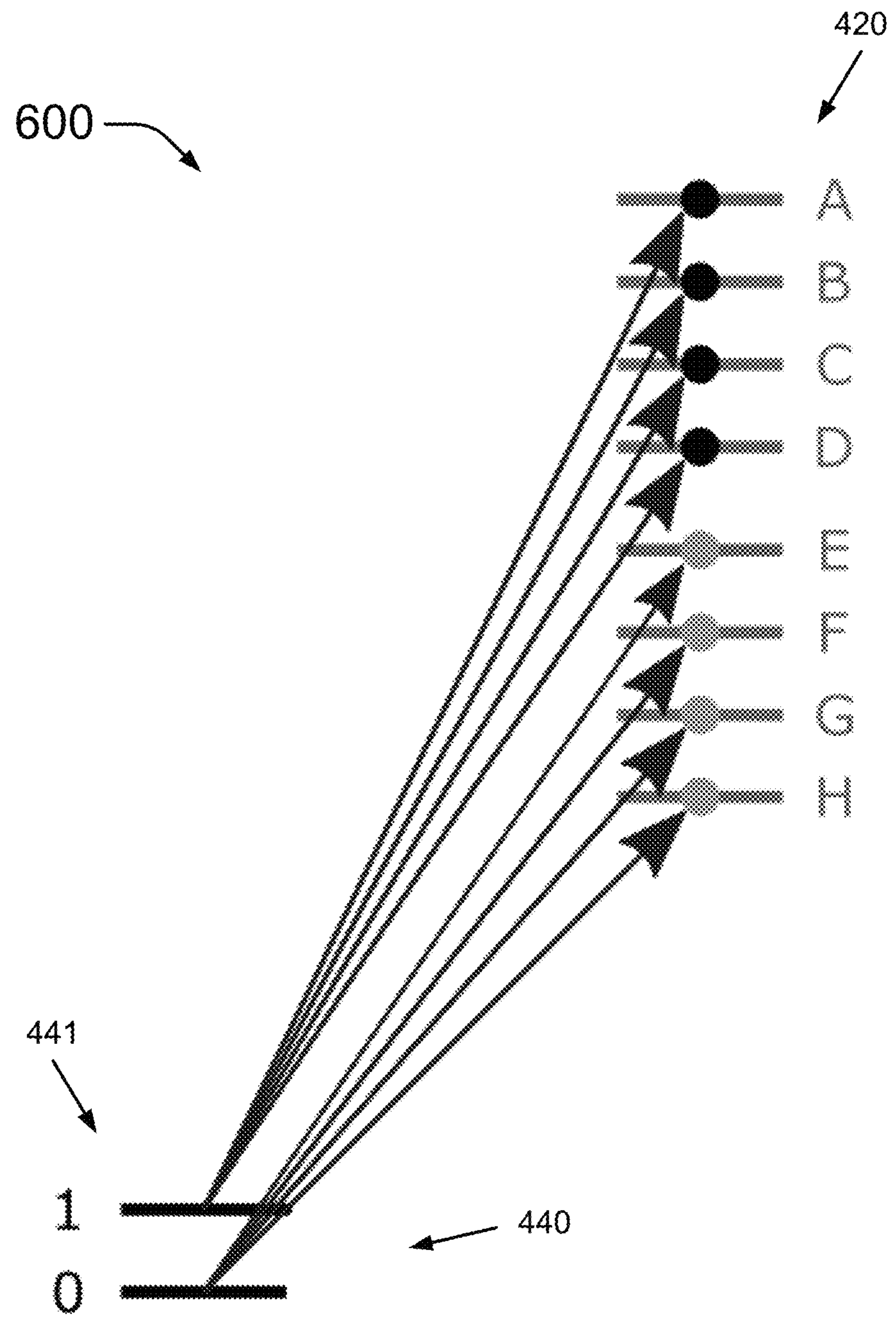
FIG. 6 illustrates an example of a multi-pulse shelving sequence in which optical pulses corresponding to each arrow are applied sequentially in accordance with aspects of this disclosure.

The multi-pulse shelving sequence is illustrated in the diagram 600 in FIG. 6 shown below, and the multi-pulse deshelving sequence is illustrated in the diagrams 700, 720, and 740 in FIGS. 7A-7C. A variation of this sequence can be implemented that involves deshelving the 1 qubit state instead of the 0 qubit state for qubit state detection but it is not shown. Another variation that involves modifying step 5 to pump the recently-deshelved population to a metastable state that is not used for shelving (e.g., the non-shelving metastable manifold 430) rather than to another state in the ground-state manifold 440.

The diagram 600 in FIG. 6 illustrates an example of a multi-pulse shelving sequence (e.g., in connection with steps 1-3 above) in which optical pulses corresponding to each arrow are applied sequentially.

Figure 7A:
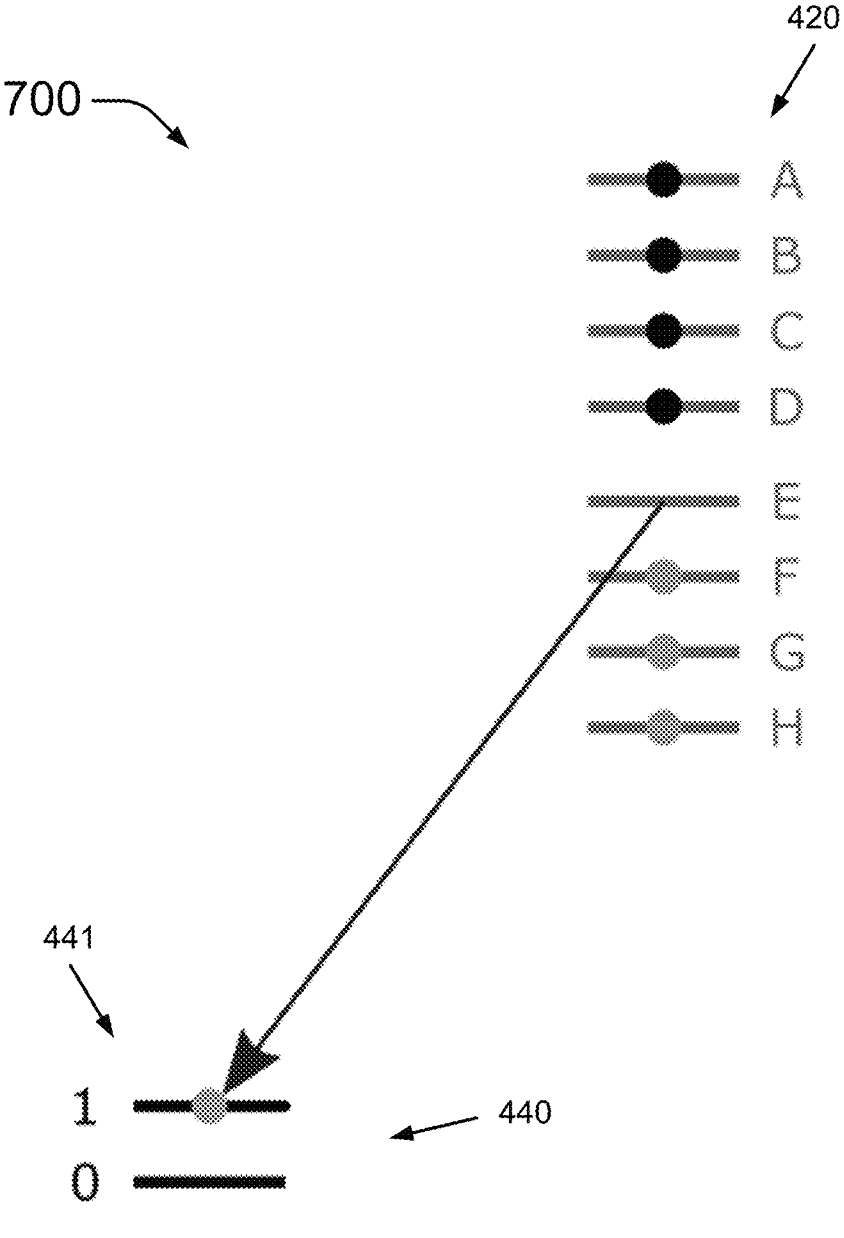
FIG. 7A illustrates an example of a first step of the multi-pulse deshelving sequence in which the population of one metastable state is deshelved in accordance with aspects of this disclosure.

The diagram 700 in FIG. 7A illustrates an example of a first step or phase of the multi-pulse deshelving sequence (e.g., in connection with step 4 above) in which the population of one metastable state is deshelved. In this example, metastable state E from the shelving metastable manifold 420 is deshelved to qubit state 1 of the qubit states 441 in the ground-state manifold 440.

The diagram 720 in FIG. 7B illustrates an example of a second step or phase of the multi-pulse deshelving sequence (e.g., in connection with step 5 above) in which the population that was deshelved in the first step is optically pumped to the 0 qubit state. In this example, the 1 qubit state is emptied.

Figure 7C:
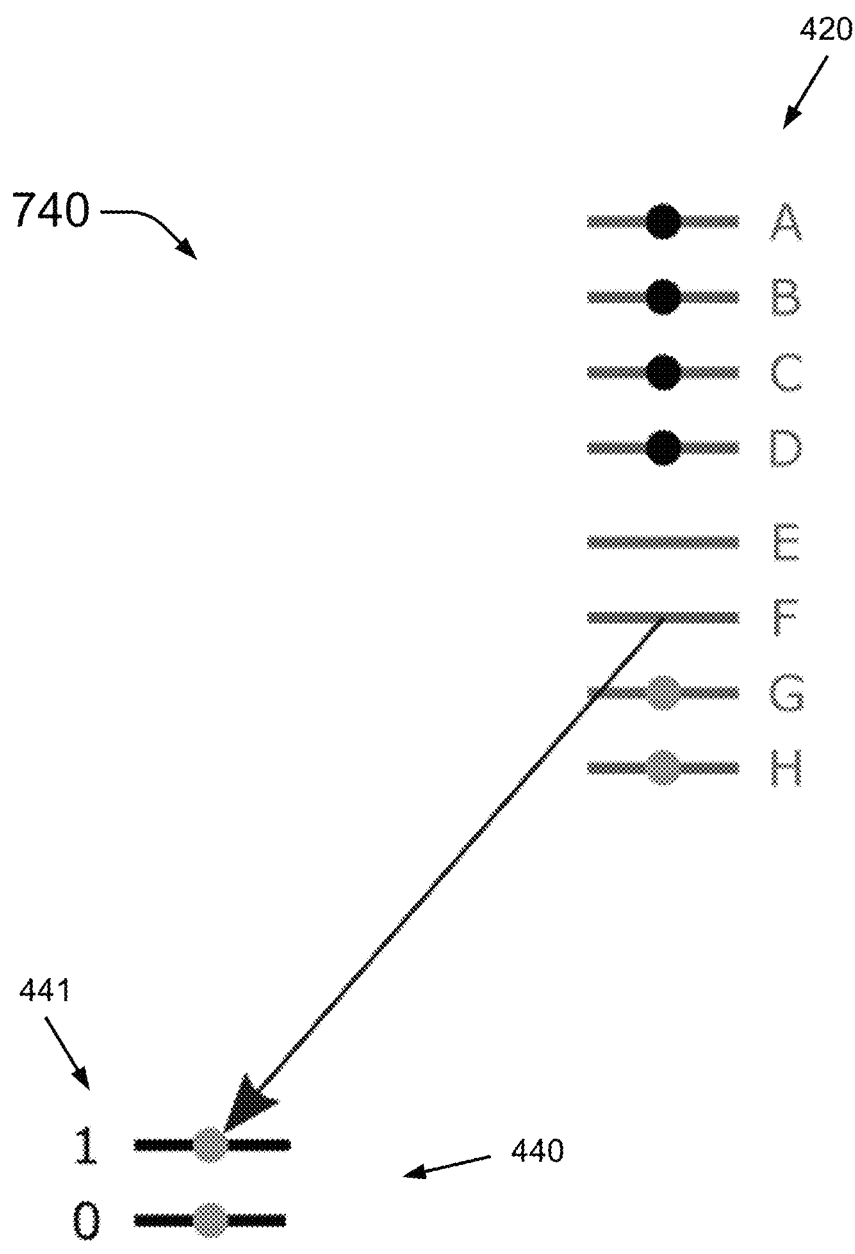
FIG. 7C illustrates an example of having the first and second steps of the multi-pulse deshelving sequence repeated to depopulate all desired metastable states in accordance with aspects of this disclosure.

The diagram 740 FIG. 7C illustrates an example of having the first and second steps of the multi-pulse deshelving sequence (e.g., FIGS. 7A,7B) repeated to depopulate all desired metastable states. It is also possible to repeat the sequence multiple times with the same metastable states to ensure that they are emptied with a very high fidelity.

The scheme described above in connection with FIGS. 6 and 7A-7C is compatible with using multiple types of optical pulses for the shelving/deshelving operations. For example, simple square pulses can be used for technical simplicity, or composite pulse schemes (e.g., Knill, BB1, or SK1) can be used that are designed to be robust to various types of technical error. Additionally, the multi-pulse deshelving sequence can be repeated multiple times so that we deshelve from each metastable state multiple times, increasing the fidelity of the overall deshelving operation.

Moreover, although employing these multi-pulse shelving and deshelving sequences is advantageous in many instances, the overall error detection protocol can also work with shelving each qubit state to a single metastable state, which again can be done using either simple square pulses or composite pulse schemes.

Detecting Subspace Leakage to Non-Shelving Metastable Manifold

Figure 8:
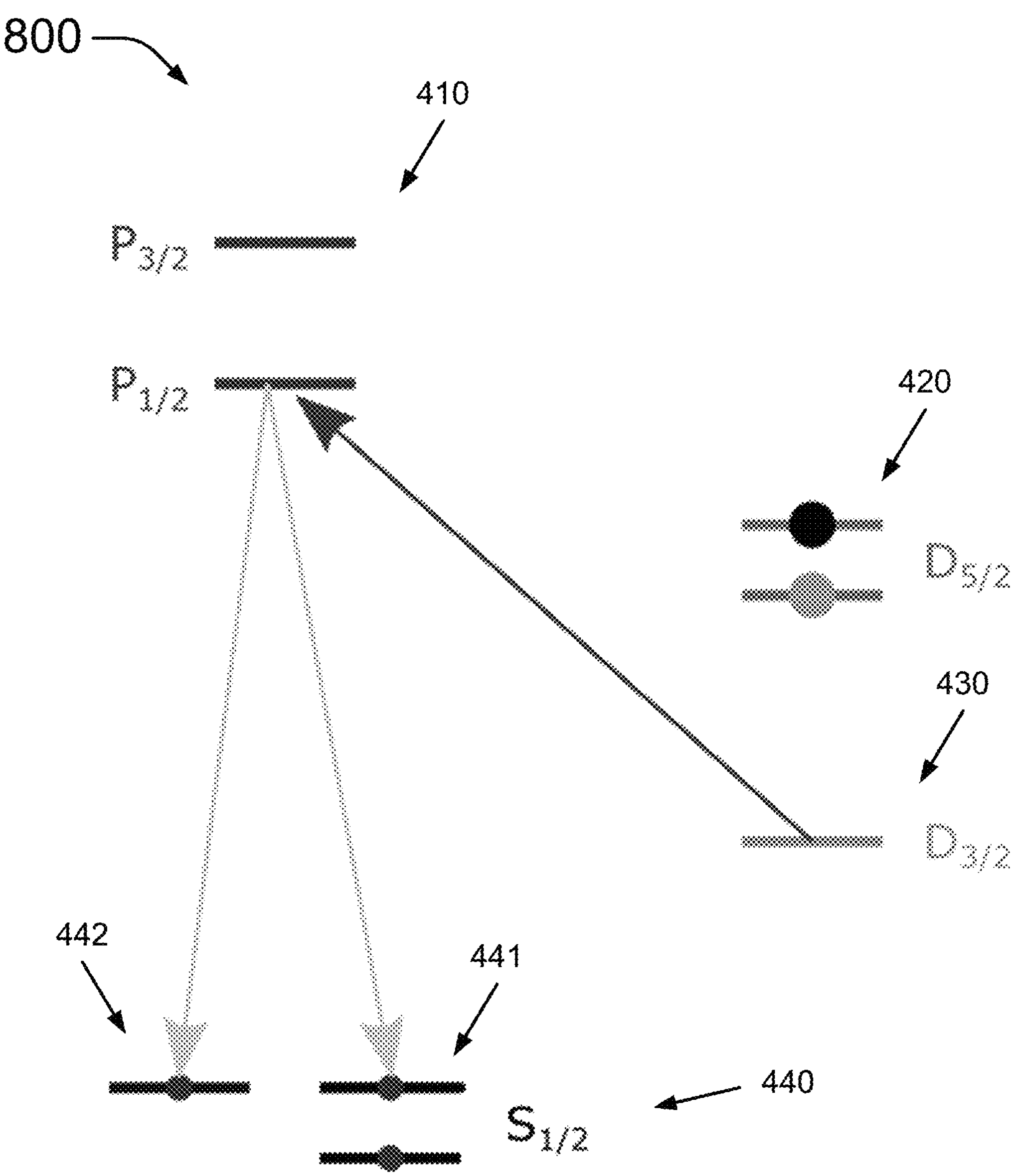
FIG. 8 illustrates an example of repumping population that had been pumped to the $D_{3/2}$ metastable manifold because of subspace leakage in accordance with aspects of this disclosure.

When spontaneous emission occurs, the ion's state can decay either to the ground-state manifold or to one of multiple metastable manifolds. In barium, for example, one may choose the qubit states to be the states in the ground-state $S_{1/2}$ manifold (see e.g., diagram 800 in FIG. 8 shown below) with zero spin projection along the magnetic field ($m_F=0$).

In this example, for consistency with the description provided above, the $S_{1/2}$ manifold corresponds to the ground-state manifold 440 (with qubit states 441 and non-qubit states 442), the $P_{1/2}$ and $P_{3/2}$ optically excited states correspond to the optically excited states 410, the $D_{5/2}$ metastable manifold corresponds to the shelving metastable manifold 420, the $D_{3/2}$ metastable manifold corresponds to the non-shelving metastable manifold 430.

Raman transitions are driven using the optical transitions between the $S_{1/2}$ ground state and the $P_{1/2}$ and $P_{3/2}$ optically excited states. When a spontaneous emission error occurs, these optically excited states can also decay either back to the $S_{1/2}$ ground-state manifold or to the $D_{3/2}$ or $D_{5/2}$ metastable manifolds. Although the example shown in connection with FIG. 8 uses Ba states for specificity, these schemes may extend to other atomic species with substantially similar or different atomic structures according to aspects of the present disclosure. Moreover, the various techniques described herein can be used with I=½ nuclei (e.g., Ba-133), with I>½ nuclei (e.g., Ba-137), or with other types of atomic species.

The procedure described above can detect subspace leakage to all states in the $S_{1/2}$ manifold other than the qubit states. This disclosure describes several extensions that would additionally detect subspace leakage to metastable manifolds. This includes the metastable manifold used for shelving, which in this case can be chosen to be $D_{5/2}$.

First, the procedure for detecting leakage to the non-shelving metastable manifolds is described herein. In one aspect, the detection scheme is described with respect to $D_{3/2}$, but this is extensible to any metastable manifold that is not used for shelving. Typically, an additional laser (e.g., a repump laser) is used to excite population from $D_{3/2}$ to an optically excited manifold, from where it decays back to the ground state. This has the effect of continually emptying out $D_{3/2}$. Typically, this repump laser may be left on during the computation with no ill effect. However, to detect subspace leakage to $D_{3/2}$, this disclosure proposes to leave the repump laser off during the computation and initial shelving of the qubit states to the $D_{5/2}$ manifold. Once the qubit states have been shelved, the repump laser is turned back on. This has the effect of pumping any population that leaked to $D_{3/2}$ during the computation back to $S_{1/2}$, where it can be detected to indicate that an error has occurred. This repumping step is illustrated in a diagram 800 in FIG. 8 (arrows from $D_{3/2}$ to $P_{1/2}$ and then to $S_{1/2}$). This shows the repumping (circles in non-qubit states 442 and qubit states 441 in $S_{1/2}$) that had been pumped to the $D_{3/2}$ metastable manifold because of subspace leakage. Note that this step is performed after the qubit states have been shelved to the $D_{5/2}$ manifold. Chronologically, this step could be performed between the steps described in FIGS. 5B and 5C.

This repump is performed via an optically excited state, such as $P_{1/2}$, that cannot decay to $D_{5/2}$. Otherwise, if repumped via $P_{3/2}$, for example, then the population that had leaked to $D_{3/2}$ could decay from $P_{3/2}$ to the shelving manifold $D_{5/2}$, which would defeat the error detection scheme with some nonzero probability.

Detecting Subspace Leakage to Shelving Metastable

Figure 9:
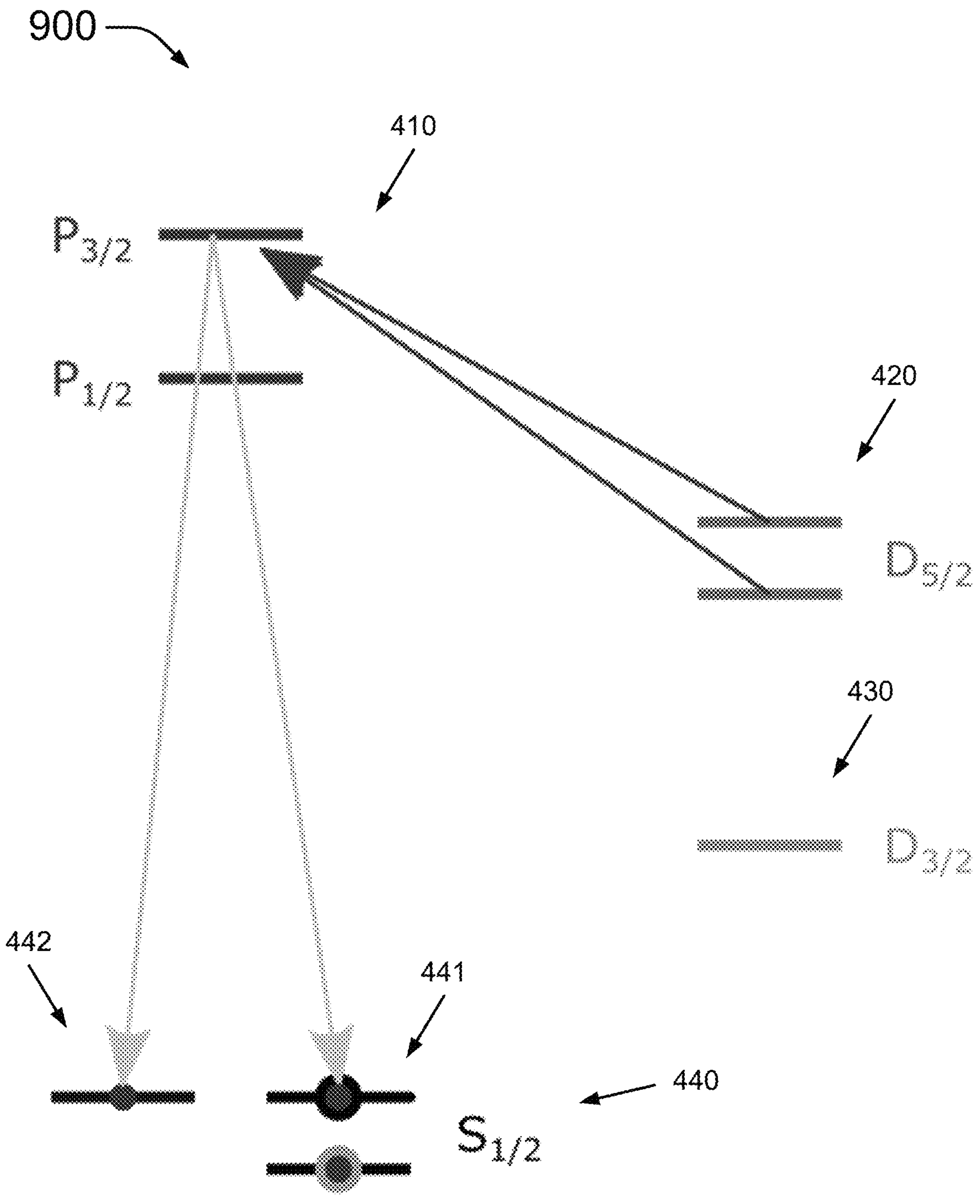
FIG. 9 illustrates an example of repumping population that had been pumped to the $D_{5/2}$ metastable manifold because of subspace leakage in accordance with aspects of this disclosure.

In connection with the schematic in the diagram 800, there is also a procedure for detecting subspace leakage to the metastable manifold that is used for shelving, which is chosen to be $D_{5/2}$ for specificity. The simpler version of this procedure, which is capable of detecting a portion of the subspace leakage to $D_{5/2}$, is similar to the procedure described above for the non-shelving metastable manifold. After the computation is completed but before the error-detection step is performed, a repump from the $D_{5/2}$ manifold is performed. Any population that leaked to $D_{5/2}$ during the computation will be pumped with some finite probability to non-qubit states in the $S_{1/2}$ manifold, where it will be detected to indicate subspace leakage error. However, there will also be a finite probability that this population will be pumped to the qubit states, which causes an undetectable error. Nevertheless, this simple procedure still reduces the impact of subspace leakage to the $D_{5/2}$ manifold by some fraction that depends on details of the optical transition(s) used for repumping. This repumping step is illustrated in the diagram 900 in FIG. 9 shown below. Note that it is possible for some of the erroneous population to be pumped to the qubit states 441, which have not yet been shelved. This can represent an error that is not detectable by this protocol. This step is performed before the qubit states (larger circles) have been shelved to the $D_{5/2}$ manifold. Chronologically, this step can be performed before the step illustrated in FIG. 5B.

There is also a more involved procedure capable of detecting all subspace leakage to the $D_{5/2}$ manifold. If the qubit states in the $S_{1/2}$ manifold that have $m_F=0$ are chosen, then there exists some set of states in the $P_{3/2}$ manifold (those with $|m_F|>1$, which we may loosely call "stretch states") that cannot decay to either qubit state. If population from the $D_{5/2}$ manifold is repumped to $S_{1/2}$ only via these stretch states, then it cannot be pumped to a qubit state and will be detectable by the error-detection protocol.

However, not all states in the $D_{5/2}$ manifold can be coupled to a $P_{3/2}$ stretch state. What is needed in such cases, therefore, is depopulate some set of $D_{5/2}$ states via the $P_{3/2}$ stretch states and then transfer population from those $D_{5/2}$ states that cannot be repumped via the stretch states to those that can be. This transfer within the $D_{5/2}$ manifold can be accomplished, for example, using either RF fields or Raman beams that are tuned to drive transitions between specific $D_{5/2}$ states. By iteratively transferring population within the $D_{5/2}$ manifold and then repumping via the $P_{3/2}$ stretch states, all population that leaked to the $D_{5/2}$ manifold during the computation can be repumped to non-qubit states, where it will be detectable by the error-detection protocol. This sequence is illustrated in FIGS. 10A and 10B.

Figure 10A:
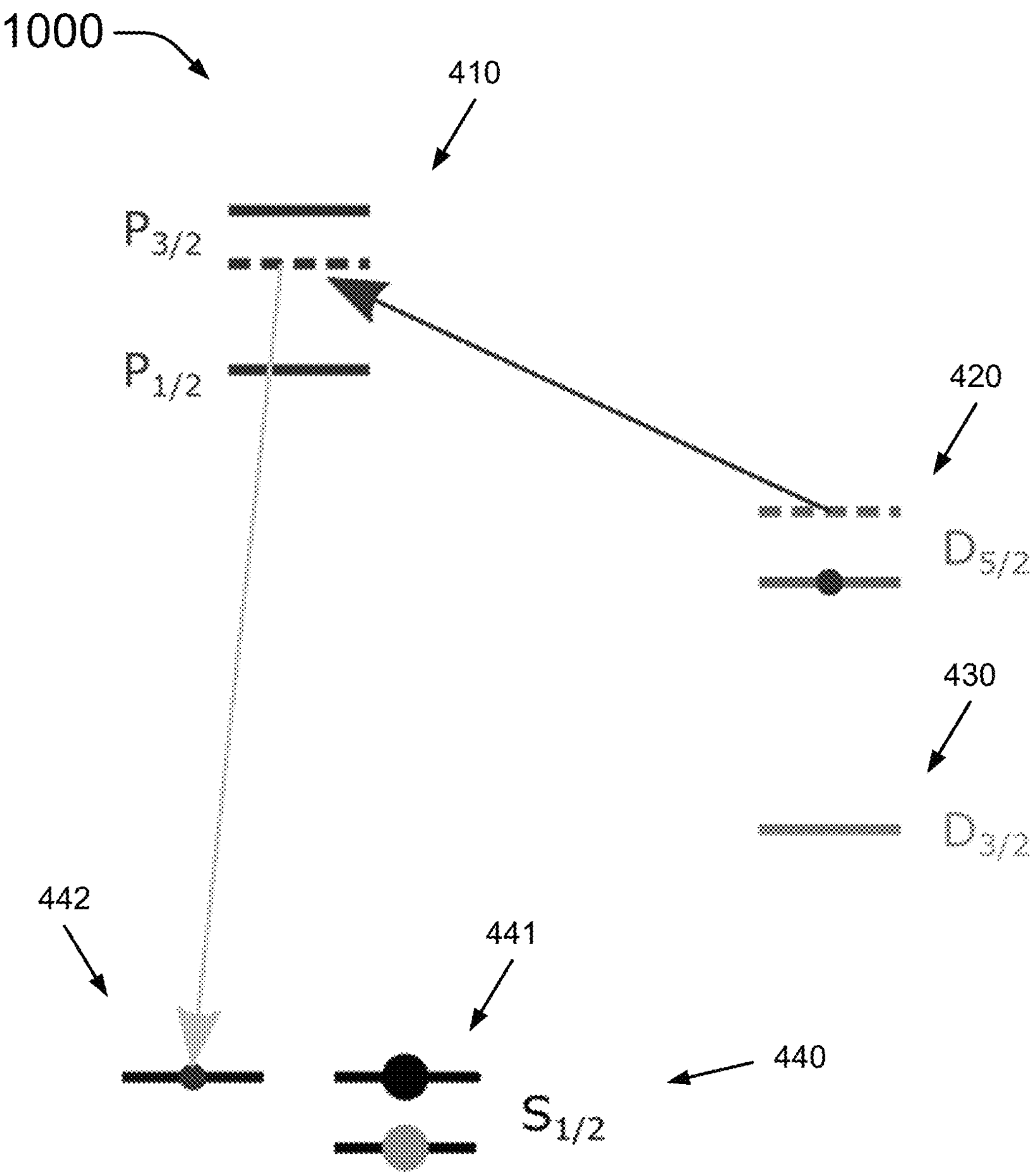
FIG. 10A illustrates an example of a first step of a more advanced scheme for repumping population that had leaked into the $D_{5/2}$ metastable manifold in accordance with aspects of this disclosure.

FIG. 10A shown below includes a diagram 1000 that illustrates an example of a first step or phase of a more advanced scheme for repumping population that had leaked into the $D_{5/2}$ metastable manifold. Here, one or several $D_{5/2}$ states are coupled to one or several $P_{3/2}$ stretch states (dashed lines in $P_{3/2}$), which cannot decay to the qubit states 441 (but can decay to the non-qubit states 442).

Figure 10B:
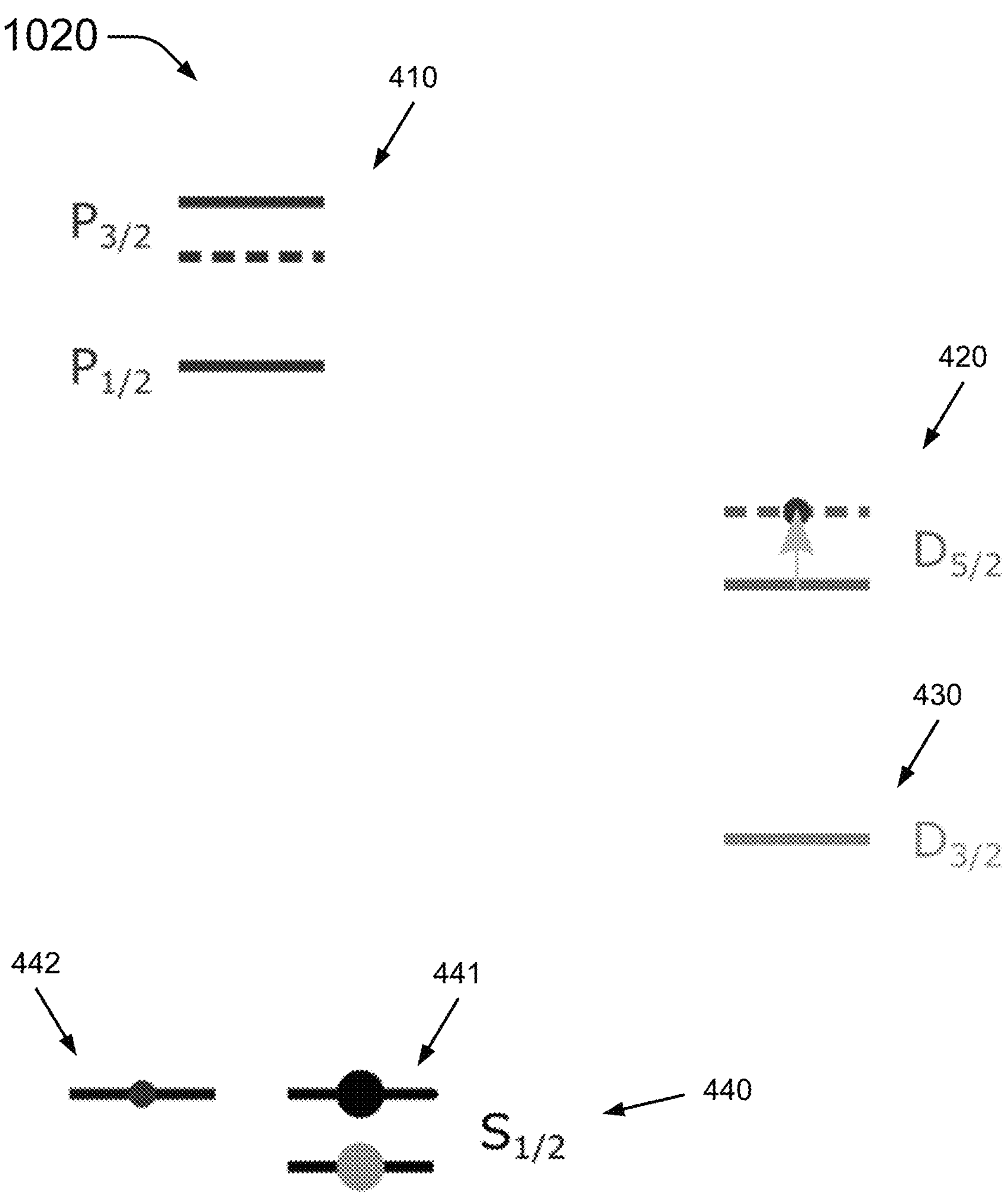
FIG. 10B illustrates an example of a second step of a more advanced scheme for repumping population that had leaked into the $D_{5/2}$ metastable manifold in accordance with aspects of this disclosure.

FIG. 10B shown below includes a diagram 1020 that illustrates an example of a second step or phase of a more advanced scheme for repumping population that had leaked into the $D_{5/2}$ metastable manifold. Here, the population from $D_{5/2}$ states that cannot couple to $P_{3/2}$ stretch states (solid line in $D_{5/2}$) is transferred to $D_{5/2}$ states that can (dashed line in $D_{5/2}$). Steps 1 and 2 in FIGS. 10A and 10B can be repeated as many times as is necessary to clear all $D_{5/2}$ states and can pump from each $D_{5/2}$ state multiple times to ensure high-fidelity repumping. Note that this repumping procedure is performed before the qubit states (large circles in the qubit states 441) have been shelved to the $D_{5/2}$ manifold. Chronologically, this step can be performed before the step illustrated in FIG. 5B.

Note that it is possible for this procedure to pump population from the $D_{5/2}$ manifold to other metastable manifolds, such as $D_{3/2}$. During this procedure, therefore, the repump beams for all other metastable manifolds to which the population might decay may need to remain off. That way, any population that is pumped to other, non-shelving metastable manifolds will be detected using the procedure described above.

FIG. 11 illustrates an example of a method 1100 for detecting subspace leakage. The method 1100 may be performed by one or more of the QIP system 200, the computer system 300, and/or one or more subcomponents of the QIP system 200 or the computer system 300.

At 1105, the method 1100 may perform a quantum operation using a plurality of qubits associated with a plurality of trapped ions, wherein a first subset of the plurality of qubits are in first one or more states and a second subset of the plurality of qubits are in second one or more states. For example, the QIP system 200, the computer system 300, and/or one or more subcomponents of the QIP system 200 or the computer system 300 may be configured to, or provide means for, performing a quantum operation using a plurality of qubits associated with a plurality of trapped ions, wherein a first subset of the plurality of qubits are in first one or more states and a second subset of the plurality of qubits are in second one or more states.

At 1110, the method 1100 may apply a first light to shuttle the first subset of the plurality of qubits from the first one or more states to one or more shelving states. For example, the optical and trap controller 220 and/or the imaging system 230 may be configured to, or provide means for, applying a first light to shuttle the first subset of the plurality of qubits from the first one or more states to one or more shelving states.

At 1115, the method 1100 may detect the second subset of the plurality of qubits as the subspace leakage. For example, the optical and trap controller 220 and/or the imaging system 230 may be configured to, or provide means for, detecting the second subset of the plurality of qubits as the subspace leakage.

At 1120, the method 1100 may apply a second light to shuttle the first subset of the plurality of qubits from the one or more shelving states to the first one or more states. For example, the optical and trap controller 220 and/or the imaging system 230 may be configured to, or provide means for, applying a second light to shuttle the first subset of the plurality of qubits from the one or more shelving states to the first one or more states.

At 1125, the method 1100 may apply a third light to readout the first subset of the plurality of qubits. For example, the optical and trap controller 220 and/or the imaging system 230 may be configured to, or provide means for, applying a third light to readout the first subset of the plurality of qubits.

Figure 12:
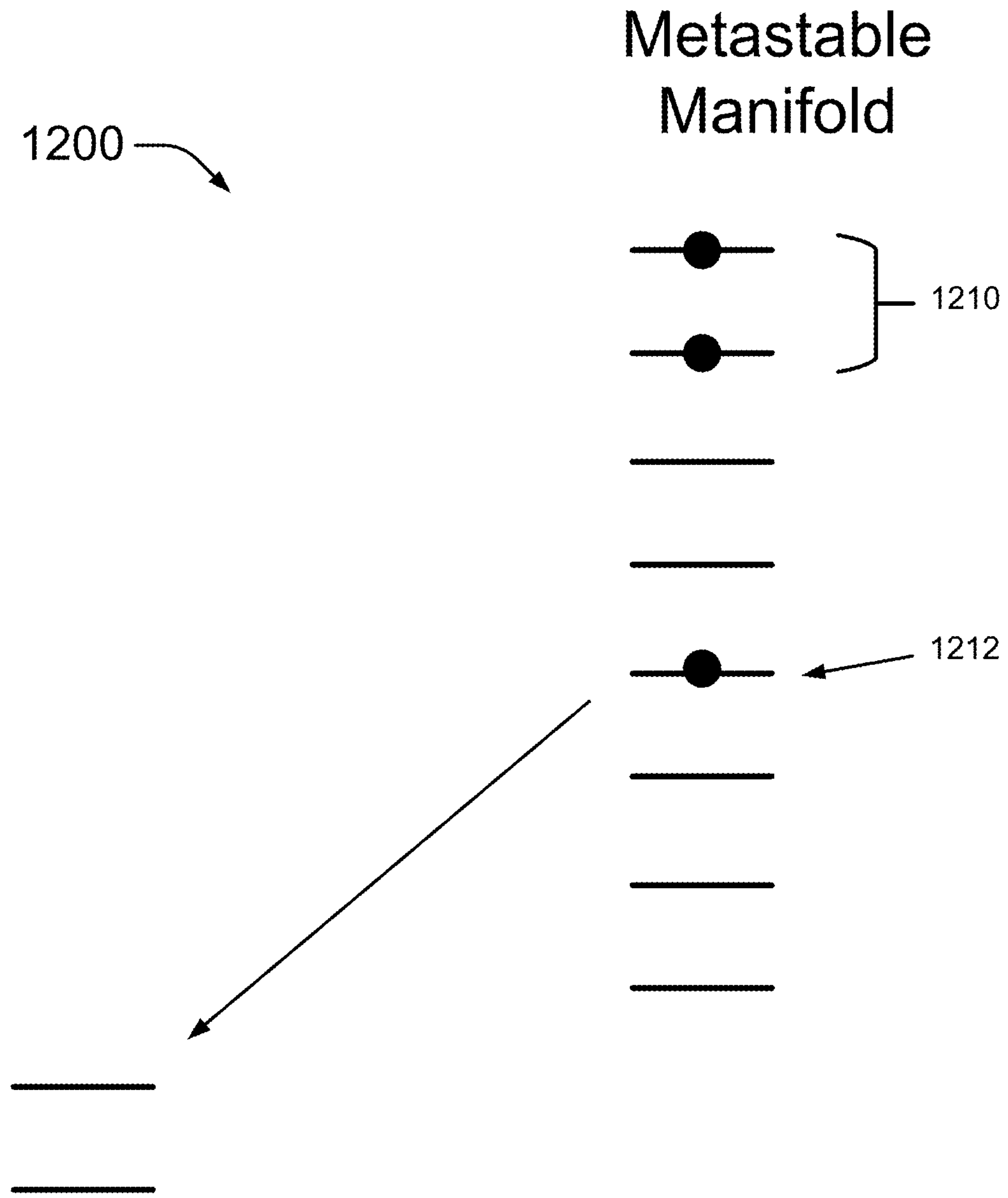
FIG. 12 illustrates an example of detecting subspace leakage for qubits in the metastable manifold in accordance with aspects of this disclosure.

FIG. 12 illustrates an example of a diagram 1200 for detecting subspace leakage of qubit ions in the metastable manifold. In some aspects, the qubit states 1210 may be a pair of states in the metastable manifold (e.g., the shelving metastable manifold). Due to unwanted optical excitation or other factors, ions may leak into the non-qubit states 1212 in the shelving metastable manifold, or into any states in the ground manifold (e.g., 441 and/or 442) or the non-shelving metastable manifold (430) as described above. An aspect of the present disclosure includes deshelving the ions in the non-qubit states 1212 to the ground state manifold using methods described above, such as the methods described with respect to FIGS. 7A-C. After the deshelving of the ions in the non-qubit states 1212, the subspace leakage may be detected using the methods described above, such as the methods described with respect to FIGS. 5C-E.

In one aspect of the present disclosure, the detection of subspace leakage of qubit ions in the metastable manifold may begin with ions in the qubit states 1210 and the non-qubit states 1212 in the shelving metastable manifold. The ions in the non-qubit states 1212 may be leaked from one or more qubit states due to unwanted optical excitation. In an exemplary aspect, an optical pump, which may include the sequential application of optical pulses to drive coherent and incoherent transitions as shown in FIGS. 7A-C and described above, may be used to deshelve the ions in the non-qubit states to the ground state manifold. Moreover, an additional laser (e.g., one or more readout lasers) may be applied to excite the ions in the ground state manifold to the optically excited states for detection as described above.

Aspects of the present disclosure includes a method for performing a quantum operation using a plurality of qubits associated with a plurality of trapped ions, wherein a first subset of the plurality of qubits are in first one or more states and a second subset of the plurality of qubits are in second one or more states, applying a first light to shuttle the first subset of the plurality of qubits from the first one or more states to one or more shelving states, detecting the second subset of the plurality of qubits as the subspace leakage, applying a second light to shuttle the first subset of the plurality of qubits from the one or more shelving states to the first one or more states, and applying a third light to readout the first subset of the plurality of qubits.

Aspects of the present disclosure includes the method above, wherein detecting the second subset of the plurality of qubits comprises applying a readout laser to the second subset.

Aspects of the present disclosure includes any of the methods above, further comprising, in response to detecting the second subset of the plurality of qubits, one or more of discarding at least a portion of the quantum operation, skipping one or more subsequent detection steps, or discarding results of the one or more subsequent detection steps.

Aspects of the present disclosure includes any of the methods above, wherein applying the first light comprises applying a first plurality of pulses to a first portion of the first subset of the plurality of qubits from a first ground state of the first one or more states to a first plurality of shelving states of the one or more shelving states and applying a second plurality of pulses to a second portion of the first subset of the plurality of qubits from a second ground state of the first one or more states to a second plurality of shelving states of the one or more shelving states.

Aspects of the present disclosure includes any of the methods above, wherein detecting the second subset of the plurality of qubits comprises detecting the second subset of the plurality of qubits in states other than the first plurality of shelving states or the second plurality of shelving states.

Aspects of the present disclosure includes any of the methods above, wherein applying the second light comprises i) applying a third plurality of pulses to deshelve a qubit of the second portion of the first subset of the plurality of qubits from a state in the second plurality of shelving states to the first ground state and ii) optically pumping the qubit to transfer the qubit from the first ground state back to the second ground state.

Aspects of the present disclosure includes any of the methods above, wherein applying the second light further comprises repeating steps i) and ii) to transfer remaining qubits of the second portion of the first subset of the plurality of qubits back to the second ground state.

Aspects of the present disclosure includes any of the methods above, wherein one or more of the first plurality of pulses, the second plurality of pulses, or the third plurality of pulses includes one or more of square pulses, Knill pulses, BB1 pulses, or SK1 pulses.

In optional aspects, if the a detection fails to detect any error, the remaining detection step(s) may continue.

The previous description of the disclosure is provided to enable a person skilled in the art to make or use the disclosure. Various modifications to the disclosure will be readily apparent to those skilled in the art, and the common principles defined herein may be applied to other variations without departing from the scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method for detecting subspace leakage, comprising:

performing a quantum operation using a plurality of qubits associated with a plurality of trapped ions, wherein a first subset of the plurality of qubits are in first one or more states of ground states and a second subset of the plurality of qubits are in second one or more states of the ground states, the second one or more states being different states than the first one or more states;

applying a first light to the plurality of qubits to shuttle only the first subset of the plurality of qubits from the first one or more states to one or more shelving states, such that the second subset of the plurality of qubits are not shuttled from the second one or more states to the one or more shelving states upon the applying of the first light to the plurality of qubits;

detecting, in response to the second subset of the plurality of qubits remaining in the second one or more states of the ground states, the second subset of the plurality of qubits as the subspace leakage;

applying a second light to shuttle the first subset of the plurality of qubits from the one or more shelving states to the first one or more states; and applying a third light to readout the first subset of the plurality of qubits.

2. The method of claim 1, further comprising, in response to detecting the second subset of the plurality of qubits, one or more of:

discarding at least a portion of the quantum operation, skipping one or more subsequent detection steps, or discarding results of the one or more subsequent detection steps.

3. The method of claim 1, wherein detecting the second subset of the plurality of qubits comprises applying an additional laser to the second subset.

4. The method of claim 1, wherein applying the first light comprises:

applying a first plurality of pulses to a first portion of the first subset of the plurality of qubits from a first ground state of the first one or more states to a first plurality of shelving states of the one or more shelving states; and applying a second plurality of pulses to a second portion of the first subset of the plurality of qubits from a second ground state of the first one or more states to a second plurality of shelving states of the one or more shelving states.

5. The method of claim 4, wherein detecting the second subset of the plurality of qubits comprises detecting the second subset of the plurality of qubits in states other than the first plurality of shelving states or the second plurality of shelving states.

6. The method of claim 4, wherein applying the second light comprises:

i) applying a third plurality of pulses to deshelve a qubit of the second portion of the first subset of the plurality of qubits from a state in the second plurality of shelving states to the first ground state; and ii) optically pumping the qubit to transfer the qubit from the first ground state back to the second ground state.

7. The method of claim 6, wherein applying the second light further comprises repeating steps i) and ii) to transfer remaining qubits of the second portion of the first subset of the plurality of qubits back to the second ground state.

8. The method of claim 7, wherein one or more of the first plurality of pulses, the second plurality of pulses, or the third plurality of pulses includes one or more of square pulses, Knill pulses, BB1 pulses, or SK1 pulses.

9. A quantum information processing (QIP) system, comprising:

a controller configured to perform a quantum operation using a plurality of qubits associated with a plurality of trapped ions, wherein a first subset of the plurality of qubits are in first one or more states of ground states and a second subset of the plurality of qubits are in second one or more states of the ground states, the second one or more states being different states than the first one or more states; and an optical system configured to:

apply a first light to the plurality of qubits to shuttle only the first subset of the plurality of qubits from the first one or more states to one or more shelving states, such that the second subset of the plurality of qubits are not shuttled from the second one or more states to the one or more shelving states upon the applying of the first light to the plurality of qubits;

detect, in response to the second subset of the plurality of qubits remaining in the second one or more states of the ground states, the second subset of the plurality of qubits as the subspace leakage;

apply a second light to shuttle the first subset of the plurality of qubits from the one or more shelving states to the first one or more states; and apply a third light to readout the first subset of the plurality of qubits.

10. The QIP system of claim 9, wherein the controller is further configured to, in response to detecting the second subset of the plurality of qubits, perform one or more of:

discarding at least a portion of the quantum operation, skipping one or more subsequent detection steps, or discarding results of the one or more subsequent detection steps.

11. The QIP system of claim 9, wherein the optical system is further configured to apply an additional laser to the second subset of the plurality of qubits.

12. The QIP system of claim 9, wherein the optical system is further configured to:

apply a first plurality of pulses to a first portion of the first subset of the plurality of qubits from a first ground state of the first one or more states to a first plurality of shelving states of the one or more shelving states; and apply a second plurality of pulses to a second portion of the first subset of the plurality of qubits from a second ground state of the first one or more states to a second plurality of shelving states of the one or more shelving states.

13. The QIP system of claim 12, wherein the optical system is further configured to detect the second subset of the plurality of qubits in states other than the first plurality of shelving states or the second plurality of shelving states.

14. The QIP system of claim 12, wherein the optical system is further configured to:

i) apply a third plurality of pulses to deshelve a qubit of the second portion of the first subset of the plurality of qubits from a state in the second plurality of shelving states to the first ground state; and ii) optically pump the qubit to transfer the qubit from the first ground state back to the second ground state.

15. The QIP system of claim 14, wherein the optical system is further configured to repeat steps i) and ii) to transfer remaining qubits of the second portion of the first subset of the plurality of qubits back to the second ground state.

16. The QIP system of claim 15, wherein one or more of the first plurality of pulses, the second plurality of pulses, or the third plurality of pulses includes one or more of square pulses, Knill pulses, BB1 pulses, or SK1 pulses.

17. A non-transitory computer readable medium having instructions stored therein that, when executed by a processor of a quantum information processing (QIP) system, cause the processor to:

perform a quantum operation using a plurality of qubits associated with a plurality of trapped ions, wherein a first subset of the plurality of qubits are in first one or more states of ground states and a second subset of the plurality of qubits are in second one or more states of the ground states, the second one or more states being different states than the first one or more states;

cause an optical system to apply a first light to the plurality of qubits to shuttle only the first subset of the plurality of qubits from the first one or more states to one or more shelving states, such that the second subset of the plurality of qubits are not shuttled from the second one or more states to the one or more shelving states upon the applying of the first light to the plurality of qubits;

cause the optical system to detect, in response to the second subset of the plurality of qubits remaining in the second one or more states of the ground states, the second subset of the plurality of qubits as the subspace leakage;

cause the optical system to apply a second light to shuttle the first subset of the plurality of qubits from the one or more shelving states to the first one or more states; and cause the optical system to apply a third light to readout the first subset of the plurality of qubits.

18. The non-transitory computer readable medium of claim 17, further comprising instructions for, in response to detecting the second subset of the plurality of qubits, one or more of:

discarding at least a portion of the quantum operation, skipping one or more subsequent detection steps, or discarding results of the one or more subsequent detection steps.

19. The non-transitory computer readable medium of claim 17, wherein the instructions for causing to optical system to detect the second subset of the plurality of qubits comprises instructions for causing to optical system to apply an additional laser to the second subset.

20. The non-transitory computer readable medium of claim 17, wherein the instructions for causing to optical system to apply the first light comprises instructions for causing to optical system to:

apply a first plurality of pulses to a first portion of the first subset of the plurality of qubits from a first ground state of the first one or more states to a first plurality of shelving states of the one or more shelving states; and apply a second plurality of pulses to a second portion of the first subset of the plurality of qubits from a second ground state of the first one or more states to a second plurality of shelving states of the one or more shelving states.

21. The non-transitory computer readable medium of claim 20, wherein the instructions for causing to optical system to detect the second subset of the plurality of qubits comprises instructions for causing to optical system to detect the second subset of the plurality of qubits in states other than the first plurality of shelving states or the second plurality of shelving states.

22. The non-transitory computer readable medium of claim 20, wherein the instructions for causing to optical system to apply the second light comprises instructions for causing to optical system to:

i) apply a third plurality of pulses to deshelve a qubit of the second portion of the first subset of the plurality of qubits from a state in the second plurality of shelving states to the first ground state; and ii) optically pump the qubit to transfer the qubit from the first ground state back to the second ground state.

23. The non-transitory computer readable medium of claim 22, wherein the instructions for causing to optical system to apply the second light further comprises instructions for causing to optical system to repeat steps i) and ii) to transfer remaining qubits of the second portion of the first subset of the plurality of qubits back to the second ground state.

24. The method of claim 23, wherein one or more of the first plurality of pulses, the second plurality of pulses, or the third plurality of pulses includes one or more of square pulses, Knill pulses, BB1 pulses, or SK1 pulses.

* * * * *